(12) United States Patent
Suzuki et al.

(10) Patent No.: US 9,160,180 B2
(45) Date of Patent: Oct. 13, 2015

(54) CHARGING APPARATUS FOR CHARGING A SECONDARY BATTERY WITH A WIRELESS FEEDING METHOD

(71) Applicant: Sony Mobile Communications Japan, Inc., Minato-ku (JP)

(72) Inventors: Katsuya Suzuki, Gunma (JP); Kuniharu Suzuki, Tokyo (JP); Daisuke Sakai, Tokyo (JP)

(73) Assignees: Sony Corporation, Tokyo (JP); Sony Mobile Communications Inc., Minato-ku (JP)

( * ) Notice: Subject to any disclaimer, the term of this patent is extended or adjusted under 35 U.S.C. 154(b) by 417 days.

(21) Appl. No.: 13/673,122

(22) Filed: Nov. 9, 2012

(65) Prior Publication Data

US 2013/0169221 A1   Jul. 4, 2013

Related U.S. Application Data

(60) Provisional application No. 61/581,440, filed on Dec. 29, 2011.

(51) Int. Cl.
| | |
|---|---|
| *H01M 10/46* | (2006.01) |
| *H02J 7/00* | (2006.01) |
| *H02J 7/02* | (2006.01) |
| *H02J 5/00* | (2006.01) |

(52) U.S. Cl.
CPC ............ *H02J 7/0013* (2013.01); *H02J 7/0021* (2013.01); *H02J 7/0027* (2013.01); *H02J 7/0044* (2013.01); *H02J 7/025* (2013.01); *H02J 5/005* (2013.01)

(58) Field of Classification Search
CPC ....... H02J 7/0013; H02J 7/0018; H02J 7/045; H02J 7/025
USPC .................. 320/107, 108, 114, 115, 116, 132
See application file for complete search history.

(56) References Cited

U.S. PATENT DOCUMENTS

| | | | |
|---|---|---|---|
| 7,696,718 B2 | 4/2010 | Suzuki | |
| 2011/0234156 A1* | 9/2011 | Fujita | ............................ 320/108 |
| 2011/0264297 A1* | 10/2011 | Nakano | ......................... 320/108 |
| 2012/0223588 A1 | 9/2012 | Suzuki | |

FOREIGN PATENT DOCUMENTS

JP        4480048 B2     6/2010

OTHER PUBLICATIONS

U.S. Appl. No. 14/459,814, filed Aug. 14, 2014, Suzuki, et al.
U.S. Appl. No. 13/654,478, filed Oct. 18, 2012, Sakai, et al.

* cited by examiner

*Primary Examiner* — Edward Tso
(74) *Attorney, Agent, or Firm* — Oblon, McClelland, Maier & Neustadt, L.L.P.

(57) ABSTRACT

A charging apparatus including a mounting portion on which a plurality of information processing apparatuses are mounted, a power transmission unit that transmits power in a non-contact manner to each of the plurality of information processing apparatuses placed on the mounting portion, and a control unit that receives a charge order instruction from at least one of the plurality of information processing apparatuses, and controls the power transmission unit to transmit power to each of the plurality of information processing apparatuses in an order determined based on the received charge order instruction.

13 Claims, 24 Drawing Sheets

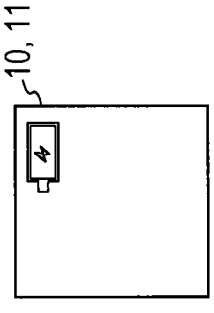
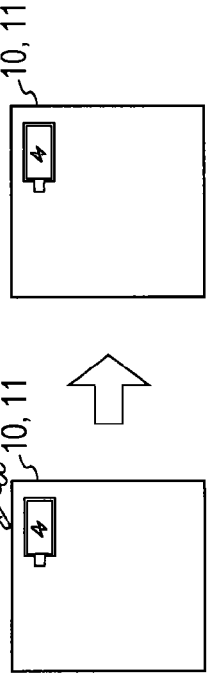
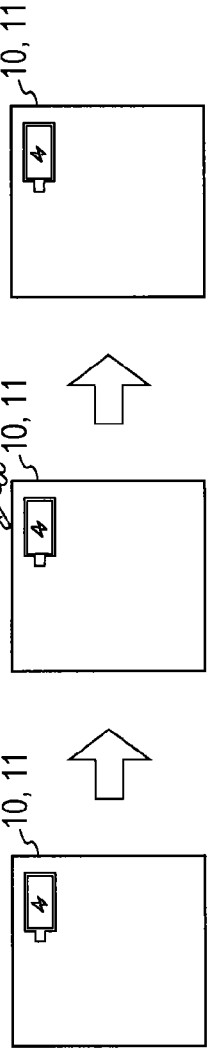
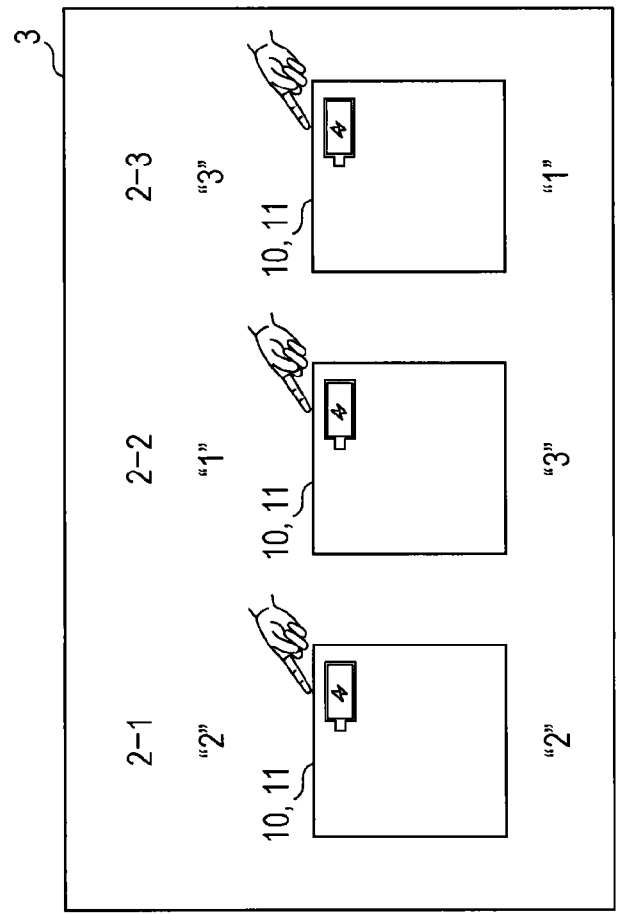

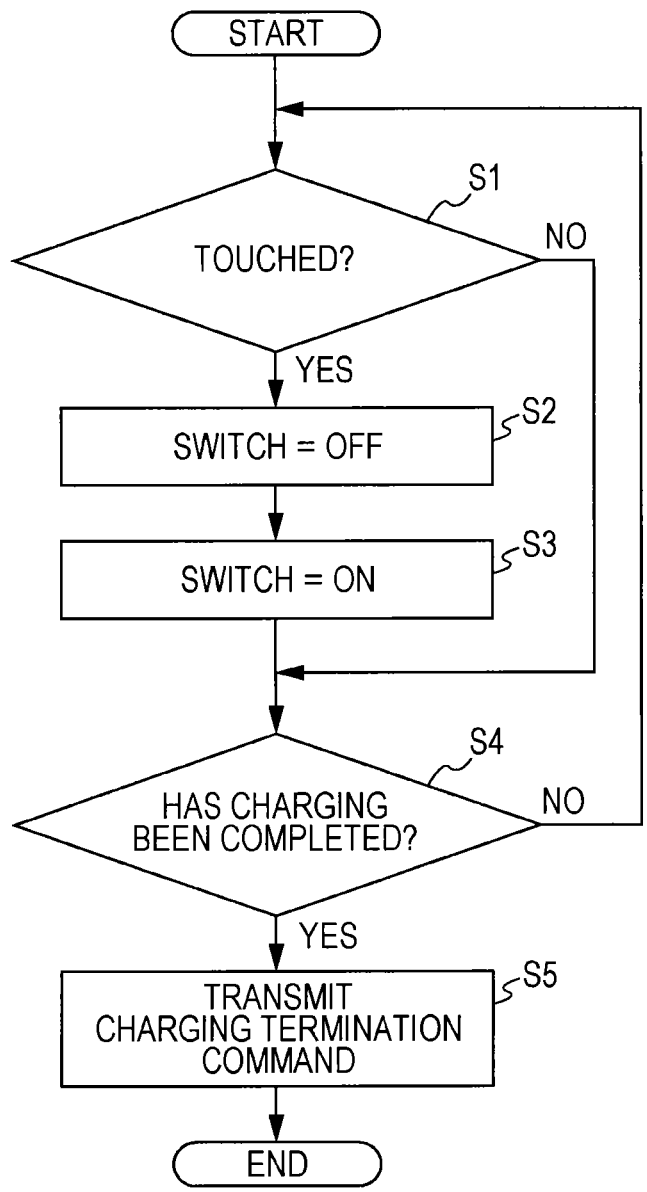

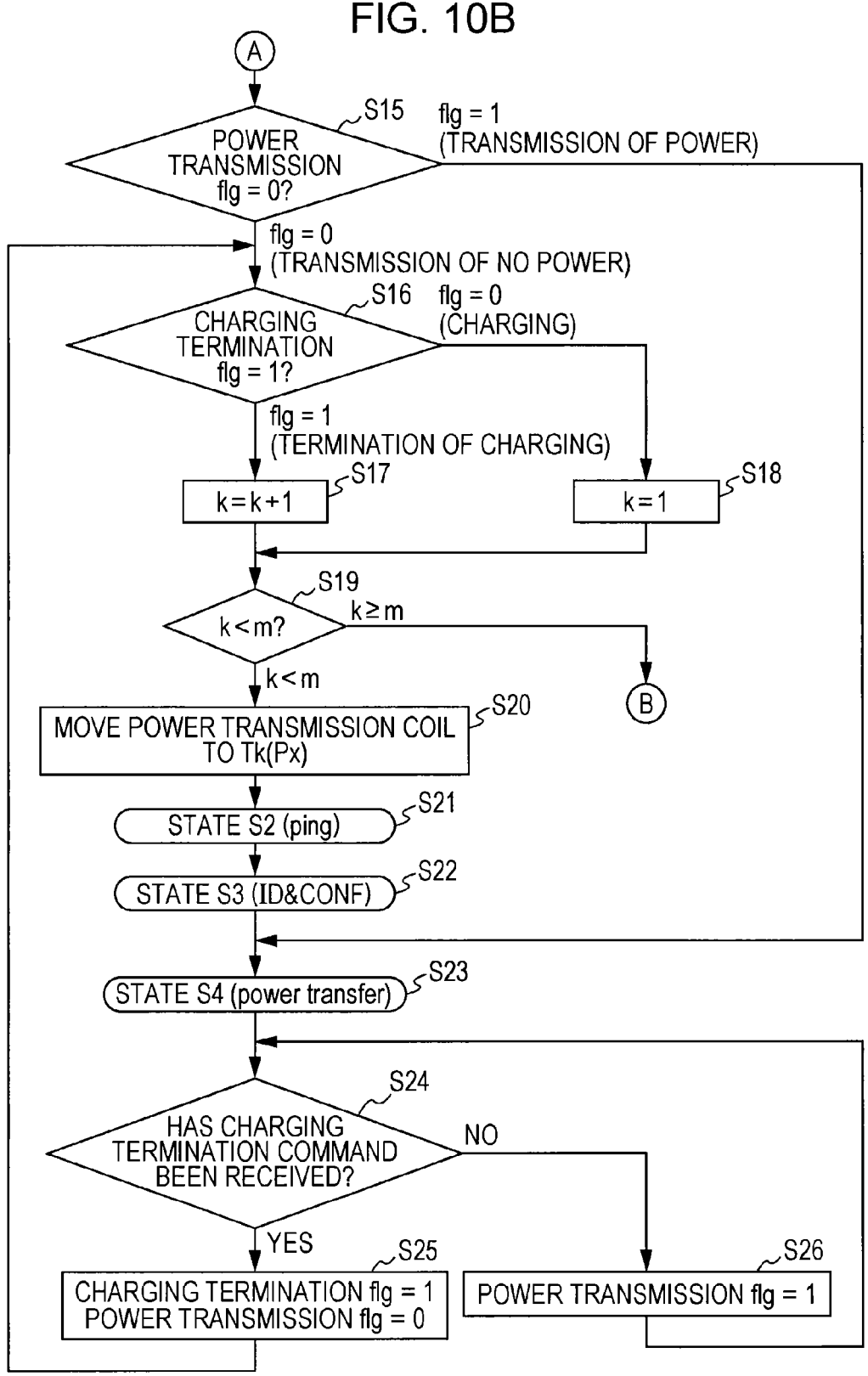

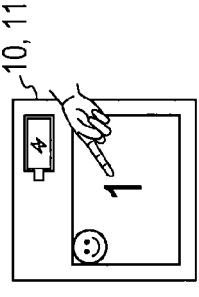
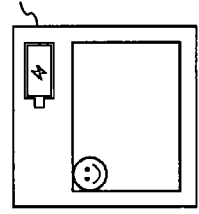
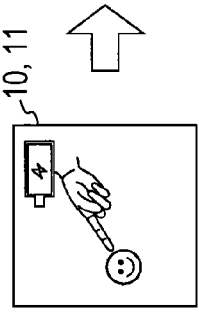
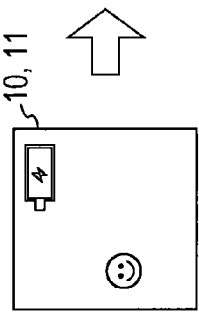
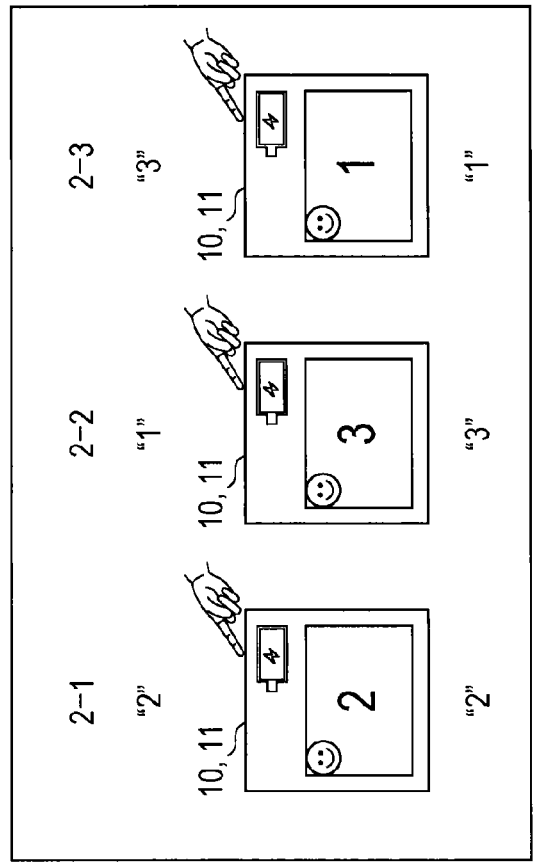

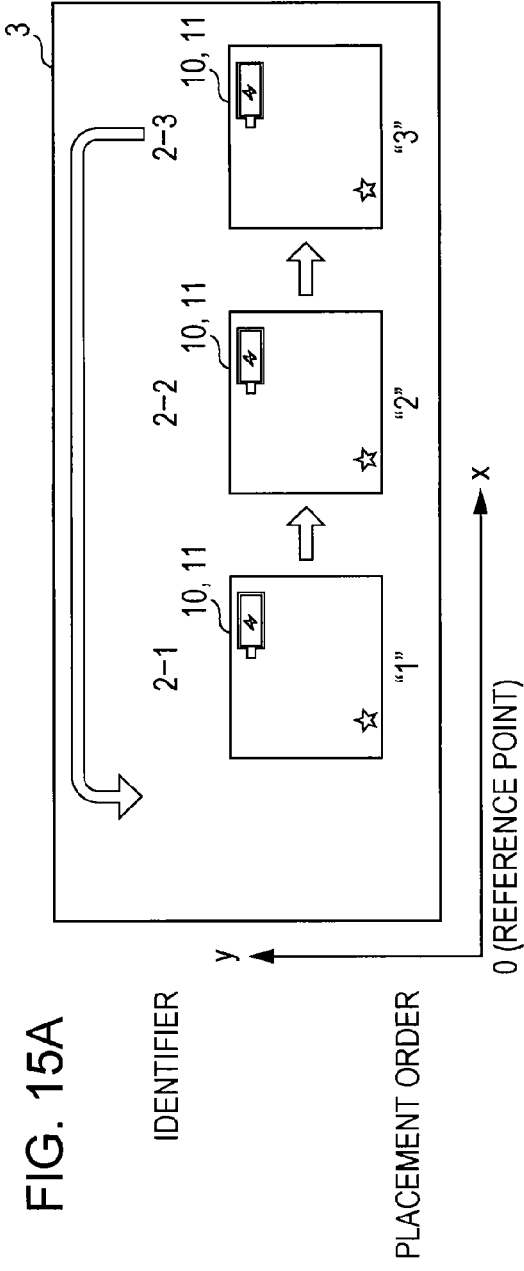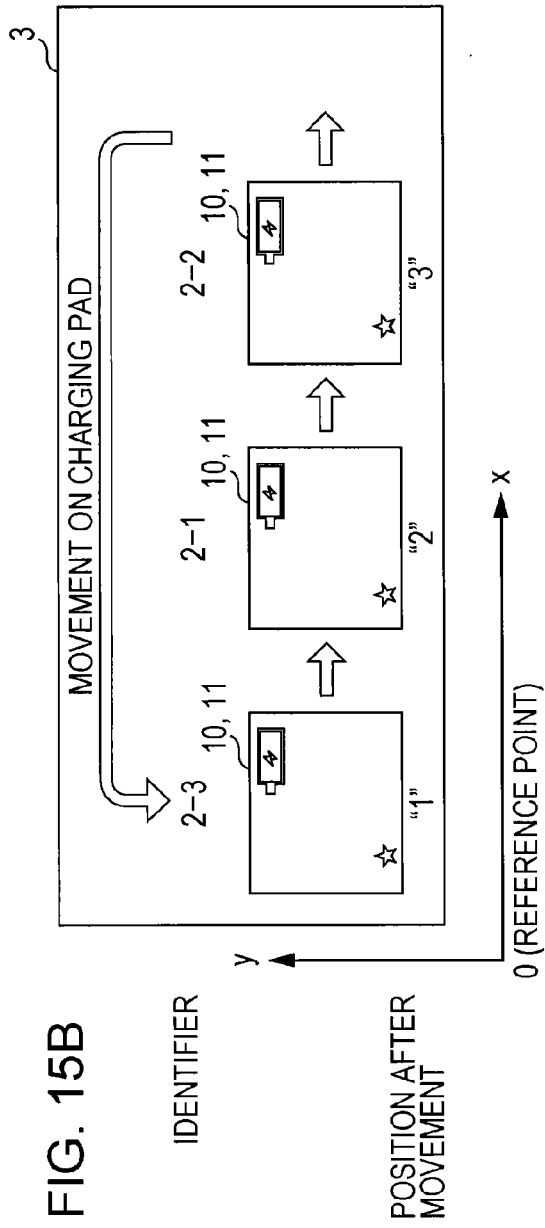

CHARGING APPARATUS FOR CHARGING A SECONDARY BATTERY WITH A WIRELESS FEEDING METHOD

CROSS REFERENCE TO RELATED APPLICATION

The present application claims the benefit of the earlier filing date of U.S. Provisional Patent Application Ser. No. 61/581,440 filed on Dec. 29, 2011, the entire contents of which is incorporated herein by reference.

BACKGROUND

1. Field of the Disclosure

The present disclosure relates to a charging apparatus for charging a secondary battery installed in a mobile terminal with a wireless feeding method.

2. Description of Related Art

In recent years, charging apparatuses capable of charging a secondary battery in a battery pack installed in an information processing terminal such as a mobile telephone with a standardized wireless feeding method have been provided.

An exemplary operation of a charging apparatus in the related art will be described with reference to FIG. 20.

FIG. 20 is a diagram illustrating a state in which a charging pad 102 in the related art charges a plurality of mobile terminals 101-1 to 101-3.

The planar charging pad 102 that is used as a charging apparatus includes a thin plate-like mounting portion 103, and can charge the mobile terminals 101-1 to 101-3 placed on the mounting portion 103 in a noncontact manner with power supplied from a power supply (not illustrated). The "noncontact manner" means that power (a radio wave) and a signal can be transmitted between each of the mobile terminals 101-1 to 101-3 and the charging pad 102 without direct electric connection between coils included therein.

The charging pad 102 includes a power transmission coil 104, and the power transmission coil 104 moves closer to one of the mobile terminals 101-1 to 101-3 and charges it. The charging pad 102 stores the order in which mobile terminals have been placed on the mounting portion 103. In a case where a plurality of mobile terminals are placed on the mounting portion 103, the charging pad 102 charges the mobile terminals in the order in which they have been placed.

Japanese Patent No. 4480048 describes a technique related to a charger for charging an electronic apparatus in a noncontact manner. This technique makes time intervals at which a signal for checking whether an electronic apparatus is placed on a charger in a rechargeable manner is generated different from intervals at which a command for checking whether the electronic apparatus requests recharging is generated. As a result, even when the battery voltage of the electronic apparatus is reduced after the charging of the electronic apparatus has been completed, the recharging of the electronic apparatus can be performed.

SUMMARY

After placing a plurality of mobile terminals on a mounting portion, a user may want to change a charge order. However, even in a case where the user wants to charge a specific one of the mobile terminals as soon as possible after the placement order of the mobile terminals has been determined, the charging of a mobile terminal placed later is not started until the charging of a mobile terminal placed earlier is completed. Accordingly, the user needs to replace the mobile terminals so as to change the charge order. This is a complicated operation for the user. An inventor recognizes the need to charge a plurality of mobile terminals in a desired order regardless of the order in which these mobile terminals have been placed.

According to a first embodiment, the disclosure is directed to a charging apparatus including a mounting portion on which a plurality of information processing apparatuses are mounted, a power transmission unit that transmits power in a non-contact manner to each of the plurality of information processing apparatuses placed on the mounting portion, and a control unit that receives a charge order instruction from at least one of the plurality of information processing apparatuses, and controls the power transmission unit to transmit power to each of the plurality of information processing apparatuses in an order determined based on the received charge order instruction.

According to another embodiment, the disclosure is directed to a method performed by a charging apparatus, the method comprising: receiving a charge order instruction from at least one of a plurality of information processing apparatuses mounted on a mounting portion of the charging apparatus; and controlling a power transmission unit to transmit power to each of the plurality of information processing apparatuses in an order determined based on the received charge order instruction.

According to another embodiment, the disclosure is directed to a non-transitory computer-readable medium including computer program instructions, which when executed by a charging apparatus, cause the charging apparatus to perform a method comprising: receiving a charge order instruction from at least one of a plurality of information processing apparatuses mounted on a mounting portion of the charging apparatus; and controlling a power transmission unit to transmit power to each of the plurality of information processing apparatuses in an order determined based on the received charge order instruction.

According to another embodiment, the disclosure is directed to an information processing apparatus comprising: a power receiving unit configured to receive non-contact power from a charging apparatus; a charge control unit that controls charging a battery included in the information processing apparatus with the power received from the charging apparatus; a control unit that generates a charge order instruction indicating an order in which the information processing apparatus is to receive the non-contact power from the charging apparatus, and that controls transmission of the charge order instruction to the charging apparatus.

According to the present disclosure, even after a plurality of mobile terminals have been placed on a charging apparatus, it is possible to easily change a charge order and charge a desired one of the mobile terminals. As a result, the charging of a mobile terminal having a higher priority of charging can be quickly started.

BRIEF DESCRIPTION OF DRAWINGS

FIGS. 7A-7D are diagrams describing a display example on a display unit in a case where a charge order is set for a mobile terminal according to the first exemplary embodiment of the present disclosure.

FIG. 9 is a flowchart illustrating an exemplary operation of a mobile terminal according to the first exemplary embodiment of the present disclosure.

FIGS. 10A and 10B is a flowchart illustrating an exemplary operation of a charging pad according to the first exemplary embodiment of the present disclosure.

FIGS. 11A to 11E are diagrams describing a display example on a display unit in a case where a charge order is set for a mobile terminal according to a second exemplary embodiment of the present disclosure.

FIGS. 15A and 15B are diagrams describing a display example on a display unit in a case where a charge order is set for a mobile terminal that is a third exemplary embodiment of the present disclosure.

DETAILED DESCRIPTION

Embodiments of the present disclosure (hereinafter referred to as exemplary embodiments) will be described below in the following order:
1. First Exemplary Embodiment (Example of Changing Charge Order by Touching Icon),
2. Second Exemplary Embodiment (Example of Changing Charge Order by Tapping Mobile Terminal or Writing Charge Order on Touch Panel),
3. Third Exemplary Embodiment (Example of Changing Charge Order by Changing Arrangement of Mobile Terminals Placed on Charging Pad),
4. Fourth Exemplary Embodiment (Example of Performing Charging While Keeping Charge Order Set in Advance in Case Where Mobile Terminal Falls from Charging Pad and Is Replaced on Charging Pad), and
5. Modification.

1. First Exemplary Embodiment

[Example of Changing Charge Order by Touching Icon]

The first exemplary embodiment of the present disclosure will be described below with reference to FIGS. 1 to 10. In this exemplary embodiment, an example in which a charging pad 3 for performing noncontact charging is used for a secondary battery 14 installed in a mobile terminal 2 that is an information processing terminal such as a mobile telephone or an electronic book terminal will be described. The charging pad 3 is used as a charging apparatus capable of performing noncontact charging with a moving coil method, and realizes a charging method of causing a computer in a control unit to execute a program and causing internal blocks to perform charging in cooperation with each other. First, an exemplary configuration of a noncontact charging system 1 including the mobile terminal 2 and the charging pad 3 will be described.

<Exemplary Configuration of Noncontact Charging System>

Figure 1:
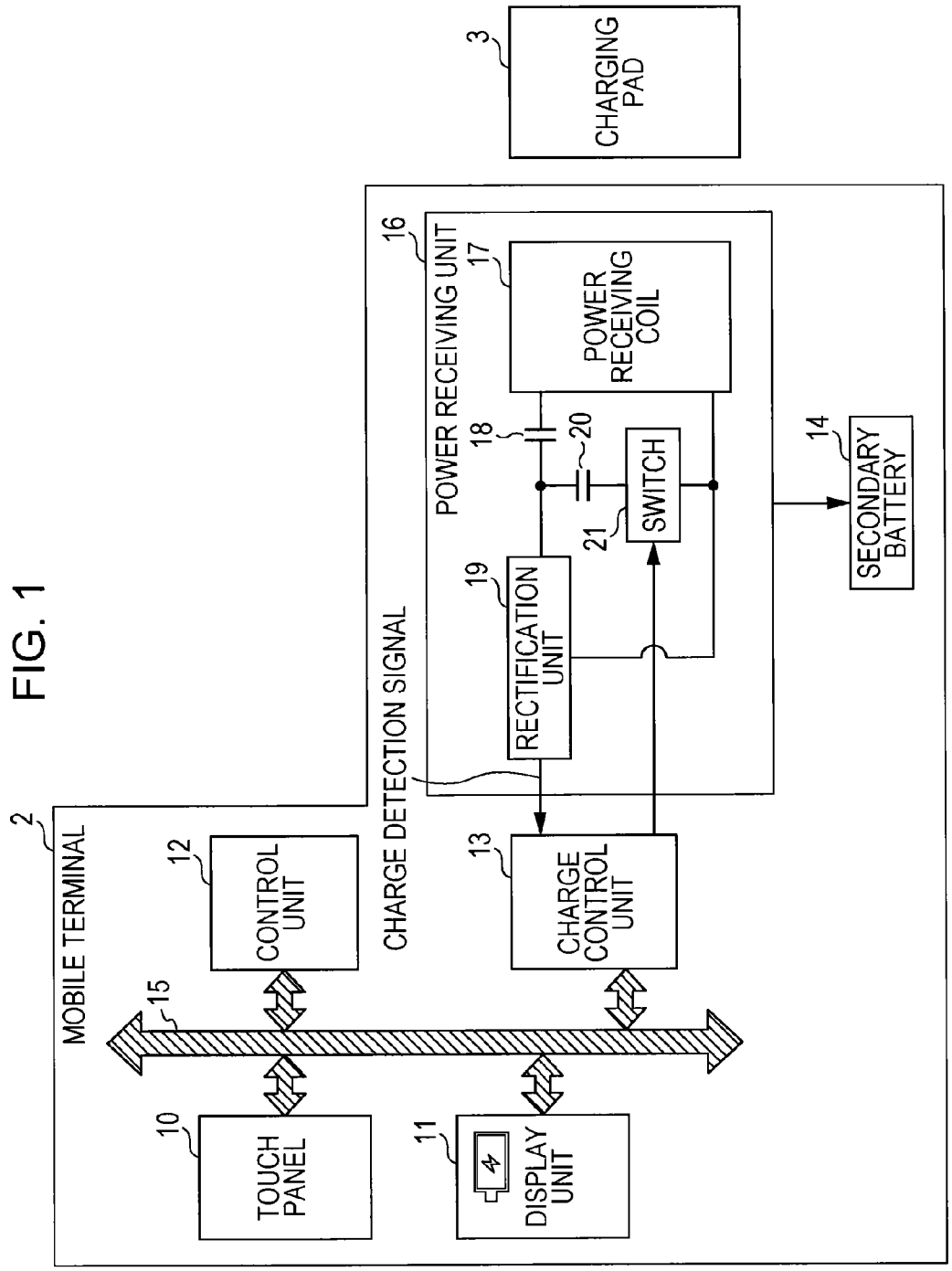
FIG. 1 is a block diagram illustrating an exemplary internal configuration of a noncontact charging system according to a first exemplary embodiment of the present disclosure.

FIG. 1 illustrates an exemplary internal configuration of the noncontact charging system 1.

The noncontact charging system 1 includes the above-described mobile terminal 2 and the above-described charging pad 3.

The mobile terminal 2 includes a touch panel 10 that allows a user to operate an icon or the like displayed on a display unit 11 for displaying an image and perform a touch input operation and the display unit 11 for displaying, for example, menus for e-mail, Internet, and phone. The touch panel 10 is superimposed on the display unit 11, and has a function of receiving a change order change instruction.

The mobile terminal 2 further includes a control unit 12 for controlling the operation of each unit in the mobile terminal 2, a charge control unit 13 for performing control processing for rectifying AC power transmitted from the charging pad 3 to a power receiving unit 16 and charging the secondary battery 14 with the rectified AC power, a data line 15 used for data communication between the control unit 12 and each unit, and the power receiving unit 16 for receiving power from the charging pad 3 in a noncontact manner. A charging unit 33 to be described later is included in the power receiving unit 16 (see FIG. 2). On the display unit 11, an icon or a text indicating the charge state of the secondary battery 14 is displayed. The secondary battery 14 is accommodated in a battery pack (not illustrated), and can be separated from the mobile terminal 2 as appropriate.

The power receiving unit 16 includes a power receiving coil 17 for receiving AC power transmitted from a power transmission coil 44 (see FIG. 4 to be described later) in the charging pad 3 in a noncontact manner, a capacitor 18 having one end connected to the power receiving coil 17 and having a predetermined capacitance, and a rectification unit 19 that is connected to the other end of the capacitor 18 and changes AC power output from the power receiving coil 17 to DC power. The rectification unit 19 outputs a charge detection signal so as to notify the charge control unit 13 that the charging pad 3 will start to transmit power to the power receiving coil 17 and the secondary battery 14 will be charged. The power receiving coil 17 functions as a secondary coil that is electromagnetically coupled to the power transmission coil 44 for transmitting AC power to the mobile terminal 2 placed on a mounting portion 49 (see FIG. 4 to be described later) in the charging pad 3 in a noncontact manner. An AC wave of the AC power serves as a carrier wave (carrier) for carrying a digital signal.

The power receiving unit 16 further includes a capacitor 20 having one end connected between the capacitor 18 and the rectification unit 19 and a switch 21 that is connected to the other end of the capacitor 20 and functions as a switch unit for disconnecting the power receiving coil 17 from the capacitor 20 or connecting the power receiving coil 17 to the capacitor 20. The charge control unit 13 causes the switch 21 to perform disconnection or connection when the control unit 12 in the mobile terminal 2 transmits to the charging pad 3 an instruction for changing the order of transmission of power from the charging pad 3.

As the secondary battery 14, for example, a lithium-ion secondary battery is used. The charge control unit 13 has a function of charging the secondary battery 14 with DC power obtained by the rectification unit 19, and performs control processing with a protection circuit (not illustrated) so as to prevent the occurrence of overcharging. Accordingly, the charge control unit 13 also has a function of measuring the amount of power remaining in the secondary battery 14.

<Exemplary Configuration of Mobile Terminal>

Figure 2:
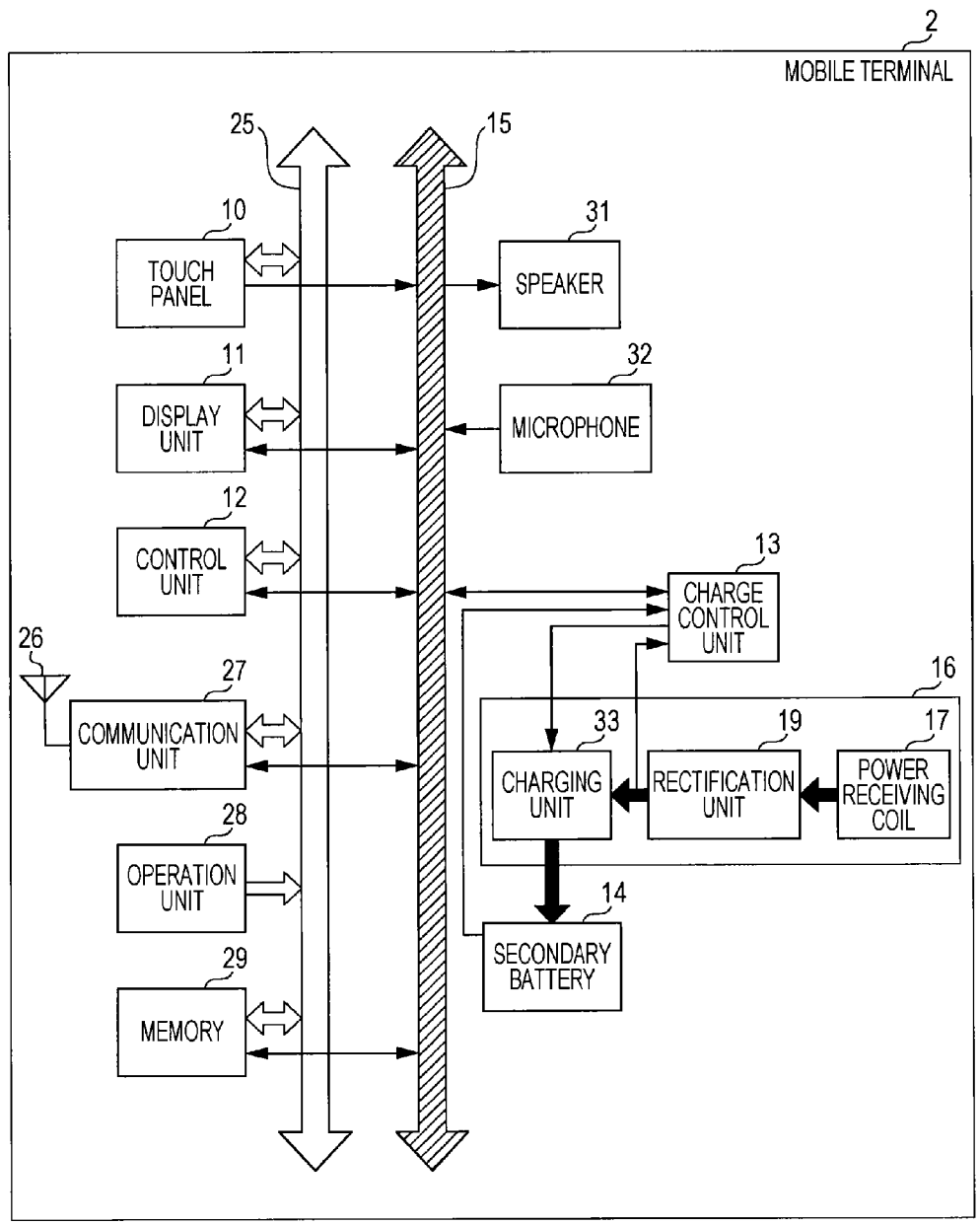
FIG. 2 is a block diagram illustrating an exemplary detailed internal configuration of a mobile terminal according to the first exemplary embodiment of the present disclosure.

FIG. 2 illustrates an exemplary detailed internal configuration of the mobile terminal 2.

The mobile terminal 2 includes an antenna 26 for communicating with a mobile terminal public network and a communication unit 27 for demodulating a signal received from the antenna 26 and modulating a signal to be transmitted from the mobile terminal via the antenna 26 in addition to the touch panel 10, the display unit 11, the control unit 12, the charge control unit 13, the data line 15, and the power receiving unit 16. The mobile terminal 2 further includes an operation unit 28 for operating the mobile terminal 2 and a memory 29 for storing an operation program, a telephone directory, etc. for the mobile terminal 2.

The mobile terminal 2 further includes a speaker 31 for outputting the voice of a far-end speaker during communication between the mobile terminal 2 and another mobile terminal via a mobile terminal public network and outputting ringing sound for the mobile terminal 2, a microphone 32 for receiving the voice of a near-end speaker during communication with a mobile terminal public network, and a charging unit 33 for charging the secondary battery 14 with DC power supplied from the rectification unit 19. The charge control unit 13 monitors a signal output from the rectification unit 19 and the voltage of the secondary battery 14, controls charging performed by the charging unit 33, and notifies the control unit 12 of a noncontact charging state to be described later. In a case where the charging pad 3 transmits power to a plurality of mobile terminals 2 in a charge order set in advance, the control unit 12 performs control processing for transmitting to the charging pad 3 an instruction for changing the charge order.

<Description of Power Receiving Unit in the Mobile Terminal 2>

Figure 3:
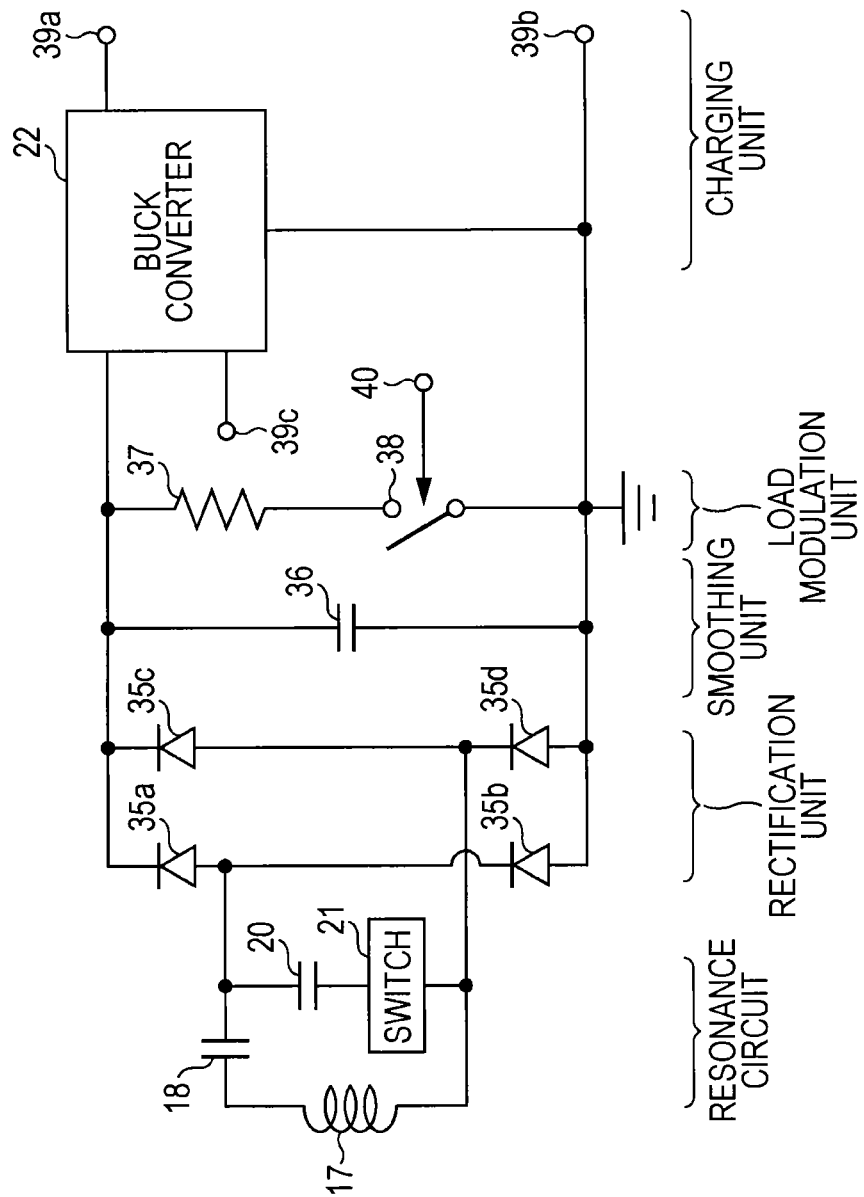
FIG. 3 is a block diagram illustrating an exemplary detailed internal configuration of a power receiving unit according to the first exemplary embodiment of the present disclosure.

FIG. 3 illustrates an exemplary detailed internal configuration of the power receiving unit 16.

The switch 21 is, for example, a Field Effect Transistor (FET), and brings a voltage to be applied to the capacitor 20 into an ON or OFF state under the control of the control unit 12 in the mobile terminal 2. When the switch 21 is turned on, the capacitor 20 is connected to a resonance circuit. At that time, the charging pad 3 can detect the position of the mobile terminal. On the other hand, when the switch 21 is turned off, the capacitor 20 is disconnected from the resonance circuit and the charging pad 3 cannot detect the position of the mobile terminal. Accordingly, even in a case where the mobile terminal 2 is placed on the charging pad 3, the charging pad 3 determines that the mobile terminal 2 has been removed. In the following description, "the placement of the mobile terminal 2 on the charging pad 3" means that the mobile terminal 2 including the secondary battery 14 is placed on the mounting portion 49 (see FIG. 4 to be described later) of the charging pad 3.

The power receiving coil 17 and the capacitors 18 and 20 form the resonance circuit. A resonant frequency is changed by turning on or off the switch 21. That is, the frequency of a radio wave to be received is changed. An alternating current signal received by the resonance circuit is changed to a direct current signal by a bridge circuit (the rectification unit 19) including diodes 35a to 35d, and the direct current signal is smoothed by a capacitor 36.

A buck converter 22 steps down the voltage of the direct current signal smoothed by the capacitor 36 and outputs the stepped-down direct current signal to terminals 39a and 39b. The stepped-down direct current signal is supplied to the secondary battery 14 via the terminals 39a and 39b. In addition, the buck converter 22 outputs a control signal to be used in the charge control unit 13 to the charge control unit 13 via a terminal 39c.

A resistance element 37 and a switching unit 38 are used for communication using a load modulation method, and the switching unit 38 is turned on or off on the basis of a control signal received from the charge control unit 13 via a terminal 40. As a result, while power is received via the power receiving coil 17, the load of the power receiving unit 16 can be modulated and information can be transmitted to a power transmission side.

<Exemplary Detailed Configuration of Charging Pad>

Figure 4:
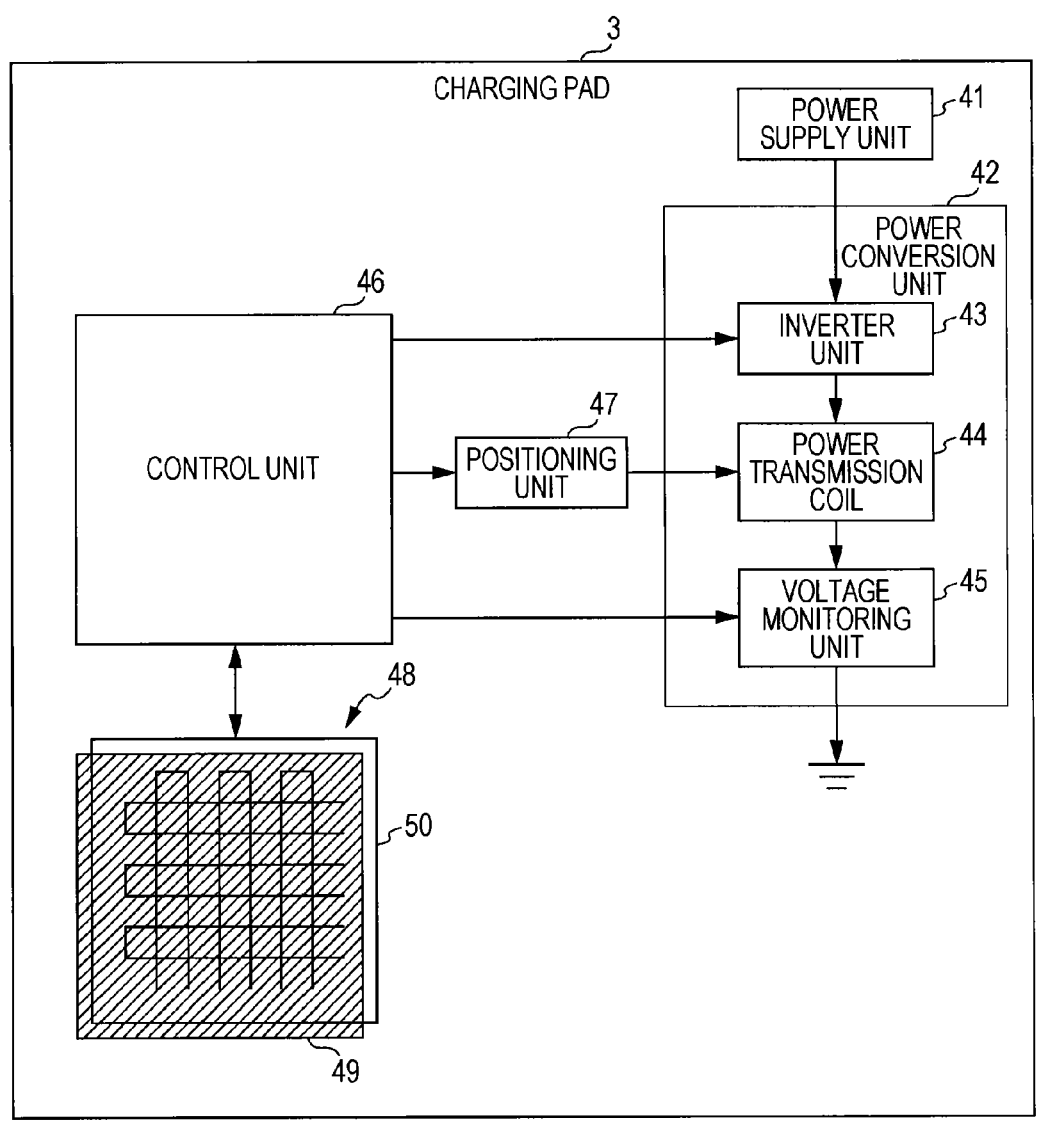
FIG. 4 is a block diagram illustrating an exemplary detailed internal configuration of a charging pad according to the first exemplary embodiment of the present disclosure.

FIG. 4 illustrates an exemplary detailed internal configuration of the charging pad 3.

The charging pad 3 includes a power supply unit 41 for outputting AC power supplied from an AC power supply (not illustrated) and a power conversion unit 42 for converting the AC power into AC power for charging. The power conversion unit 42 includes an inverter unit 43 for converting the AC power received from the power supply unit 41, the power transmission coil 44 for transmitting AC power for noncontact charging to the mobile terminal 2, and a voltage monitoring unit 45 for monitoring the alternating voltage of the power transmission coil 44. The power transmission coil 44 is used as a transmission unit for transmitting AC power to the mobile terminal 2 in a noncontact manner, and moves on a plane parallel to the mounting portion 49.

The charging pad 3 further includes a positioning unit 47 for moving the power transmission coil 44 to the position of the mobile terminal 2 detected by a position detection unit 50, a detection unit 48 for detecting a position at which the mobile terminal 2 is placed, and a control unit 46 for controlling the power conversion unit 42, the positioning unit 47, and the detection unit 48 and processing a signal to be used for communication with a power receiving side that is the mobile terminal 2.

The control unit 46 receives a charge order change instruction from the mobile terminal 2, and performs control processing for transmitting power to a plurality of mobile terminals 2 placed on the mounting portion 49, for which a charge order has already been set in advance, at positions detected by the position detection unit 50 in a changed charge order. At that time, the control unit 46 notifies the positioning unit 47 of the positions of the mobile terminals 2 in accordance with charge order change instructions received from the mobile terminals 2 for which a charge order has already been set in advance. The positioning unit 47 moves the power transmission coil 44 to the positions of the mobile terminals 2 detected by the position detection unit 50 in a changed charge order.

The detection unit 48 includes the mounting portion 49 on which a plurality of mobile terminals 2 are placed as described previously and the position detection unit 50 for detecting the position (coordinates) of each of the mobile terminals 2 on the mounting portion 49. As illustrated in FIG. 4, the mounting portion 49 is disposed on the position detection unit 50, and a coil portion of the position detection unit 50 is not seen from the outside.

<Exemplary Detailed Configuration of Position Detection Unit>

Figure 5A:
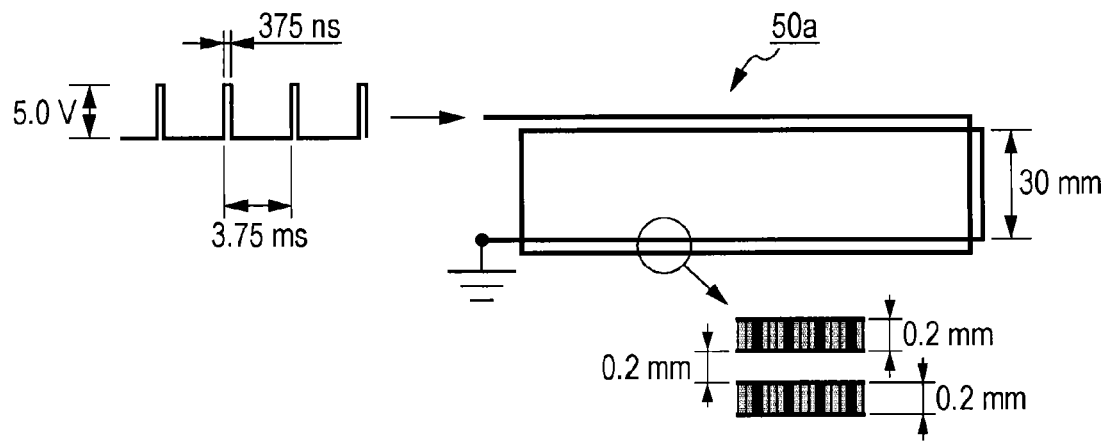
FIGS. 5A and 5B are diagrams illustrating an exemplary detailed internal configuration of a detection unit according to the first exemplary embodiment of the present disclosure.
Figure 5B:
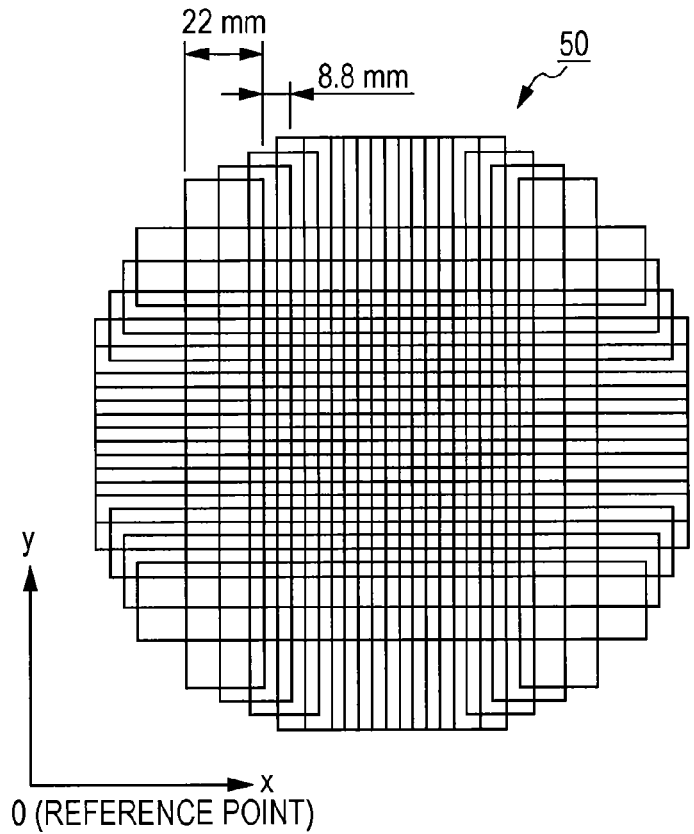

FIGS. 5A and 5B illustrate an exemplary detailed internal configuration of the position detection unit 50. FIG. 5A illustrates an exemplary shape of a coil portion of the position detection unit 50, and FIG. 5B illustrates an exemplary configuration of the position detection unit 50.

In the position detection unit 50, a plurality of detection coils 50a are arranged in x and y directions of the charging pad 3. A line width of the detection coils 50a is approximately 0.2 mm, and line intervals are also approximately 0.2 mm. As illustrated in FIG. 5B, the detection coils 50a form the substantially circular position detection unit 50. A pulsing detection voltage is input into the detection coil 50a at a predetermined time. When the mobile terminal 2 is placed on the charging pad 3, the amplitude of a detection voltage output from the detection coil 50a is changed. The position detection unit 50 determines the position of the mobile terminal 2 on the charging pad 3 by measuring detection voltages output from the detection coils 50a arranged in the x and y directions.

<Example of Noncontact Charging Operation Sequence>

Figure 6:
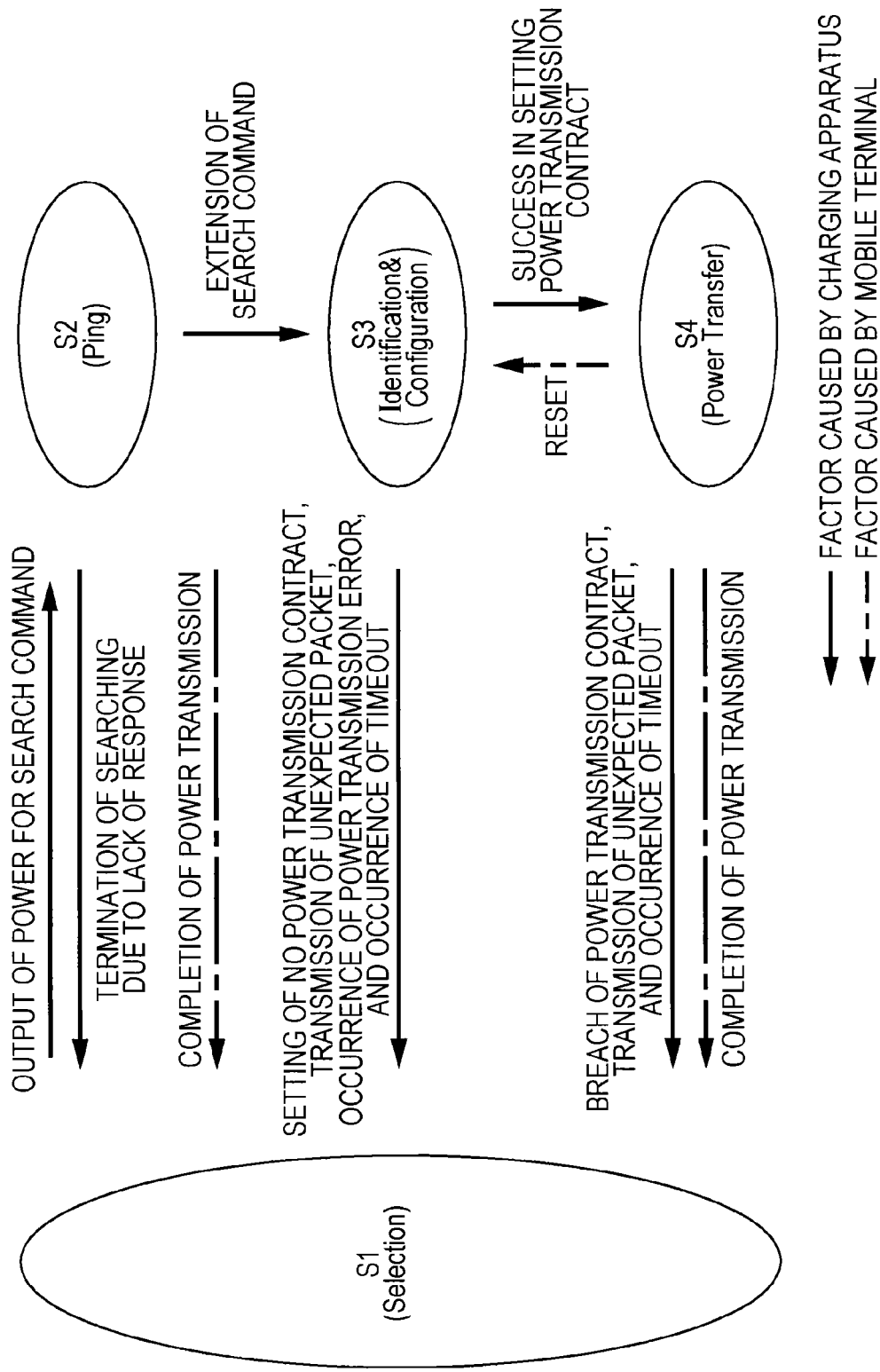
FIG. 6 is a sequence diagram illustrating an example of a noncontact charging operation according to the first exemplary embodiment of the present disclosure.

FIG. 6 illustrates an example of a noncontact charging operation sequence. Referring to FIG. 6, arrows represented by solid lines indicate factors caused by the charging pad 3, and arrows represented by broken lines indicate factors caused by the mobile terminal 2.

First, the charging pad 3 is in a state S1 (selection), and detects whether the mobile terminal 2 has been placed on the charging pad 3 or has been removed from the charging pad 3. When the charging pad 3 detects that the mobile terminal 2 has been placed, the charging pad 3 specifies the position of the mobile terminal 2, supplies power for a state S2 (ping), and is brought into the state S2.

In the state S2 (ping), the charging pad 3 outputs power for a search command (also referred to as "Digital Ping") for searching for the mobile terminal 2, and waits for a response from the mobile terminal 2. Upon receiving a response from the mobile terminal 2, the charging pad 3 is brought into a state S3 (identification & configuration). When the charging pad 3 receives no response, the charging pad 3 stops to output power for the search command and is brought back into the state S1. The charging pad 3 is also brought back into the state S1 when being received from the mobile terminal 2 a notification that charging has been completed.

In the state S3 (identification & configuration), the charging pad 3 determines whether it can transmit power to the selected mobile terminal 2, and obtains, for example, power information that is necessary for power transmission. Such information is called a "power transmission contract". The charging pad 3 sets a parameter necessary for the transition to a state S4 (power transfer), and is brought into the state S4. When the power transmission contract is not set, an unexpected packet is received, a power transmission error occurs, or a timeout occurs, the charging pad 3 is brought back into the state S1.

In the state S4 (power transfer), the charging pad 3 transmits AC power to the mobile terminal 2. When a breach of the power transmission contract occurs, an unexpected packet is received, or a timeout occurs, the charging pad 3 is brought back into the state S1. The charging pad 3 is also brought back into the state S1 when being received from the mobile terminal 2 a notification that charging has been completed. When the power transmission contract is changed, for example, when a charging state is changed to trickle charging with the maximum power that is a lower limit, the charging pad 3 is brought back into the state S3.

Regardless of a state in which the charging pad 3 is present, the charging pad 3 can recognize that the mobile terminal 2 has been removed since a timeout occurs at the time of receiving data from the mobile terminal 2 or a breach of the power transmission contract occurs.

FIGS. 7A to 7D illustrate a display example on the display unit 11 in a case where a charge order is set for the mobile terminal 2. FIG. 7A illustrates an icon displayed on the display unit 11 in a state in which the mobile terminal 2 is placed on the charging pad 3. FIG. 7B illustrates a state in which the icon is touched by a finger of a user. FIG. 7C illustrates an example in which a new charge order is set for the mobile terminal 2 on the basis of the order in which the mobile terminals 2 have been touched. FIG. 7D illustrates an exemplary order in which the mobile terminals 2 have been placed and an exemplary order in which icons have been touched.

In recent years, a plurality of mobile terminals 2 placed on the charging pad 3 have been charged in the order of placement. However, the control unit 12 in the mobile terminal 2 according to this embodiment performs control processing for transmitting to the charging pad 3 a notification that a specific icon displayed on the display unit 11 has been specified via the touch panel 10 as a charge order change instruction. The control unit 46 in the charging pad 3 specifies charge order change instructions in the order in which specific icons have been specified via the touch panels 10. Therefore, when icons displayed on the mobile terminals 2 are touched by a user's finger or a tool such as a stylus, a touch order is set as a new charge order and the mobile terminals 2 are charged in the new charge order.

FIG. 7D illustrates an example in which three mobile terminals 2 (for convenience of explanation, identifiers "2-1" to "2-3" are individually assigned to the mobile terminals 2) are placed on the charging pad 3. The order in which the mobile terminals 2 having the identifiers 2-1 to 2-3 have been placed on the charging pad 3 is 2-2, 2-1, and 2-3.

A user brings a finger closer to an icon displayed on the display unit 11 and brings the finger into contact with the icon. When the icon is touched, information indicating that the touch panel 10 of a corresponding terminal has been touched is transmitted to the charging pad 3. It is assumed that the touch order is 2-3, 2-1, and 2-2. In this case, the charging pad 3 changes the charge order to the order of 2-3, 2-1, and 2-2.

<Exemplary Operation of the Mobile Terminal 2>

Figure 8:
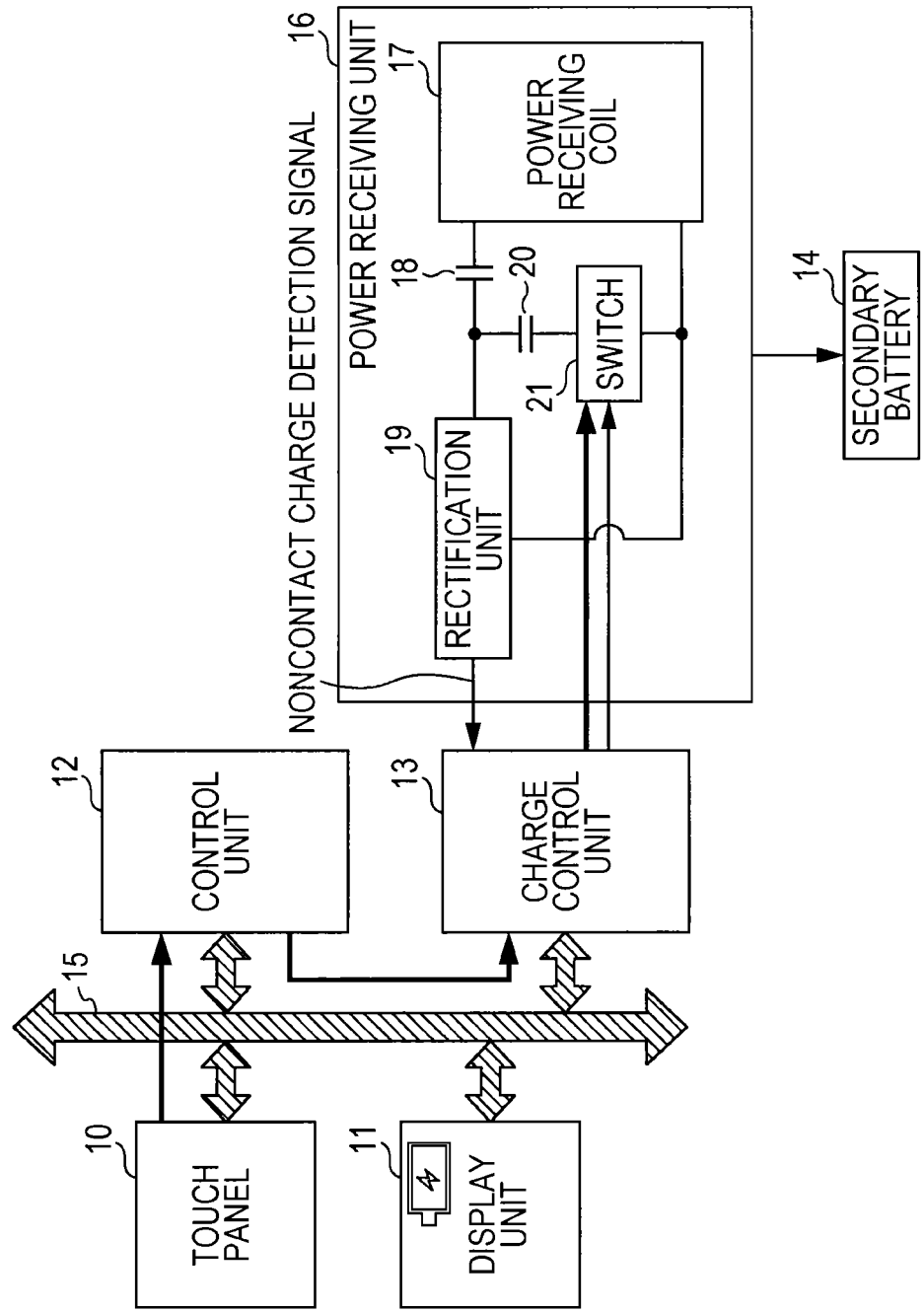
FIG. 8 is a block diagram illustrating an exemplary operation of a mobile terminal according to the first exemplary embodiment of the present disclosure at the time of noncontact charging.

FIG. 8 illustrates an exemplary operation of the mobile terminal 2 at the time of noncontact charging.

As described previously, when the mobile terminal 2 is placed on the charging pad 3, an icon indicating that charging is being performed is displayed on the display unit 11. When the icon displayed on the display unit 11 is touched by a user, the touch panel 10 transmits an operation signal including information about a touch position on the display unit 11 to the control unit 12 and the control unit 12 notifies the charge control unit 13 of the fact that a charge order change has been instructed. The charge control unit 13 usually turns on the switch 21. When a charge order change operation is performed, the charge control unit 13 turns off the switch 21 and turns on the switch 21 again. Subsequently, the power receiving unit 16 starts to charge the secondary battery 14.

Thus, when the touch panel 10 of the mobile terminal 2 placed on the charging pad 3 is touched, the secondary battery 14 included in the touched mobile terminal 2 is charged. In a case where a plurality of mobile terminals 2 are placed on the charging pad 3, the mobile terminals 2 are charged one by one.

<Method of Causing Charging Pad to Detect Mobile Terminal: Defined by WPC Specification>

The charging pad 3 supplies to the power receiving coil 17 power of a pulse train from the detection coil 50a so as to produce resonance. As a result, the change in capacitance occurs near the mobile terminal 2 placed on the charging pad 3 and resonance is produced. The detection coil 50a detects the resonance and specifies the position of the mobile terminal 2 on the charging pad 3.

Subsequently, the charging pad 3 moves the power transmission coil 44 to the specified position (x and y coordinates) and transmits a search command to the mobile terminal 2. When the charging pad 3 recognizes that power can be transmitted to the mobile terminal 2, the charging pad 3 starts to transmit power to the mobile terminal 2. Even when a plurality of mobile terminals 2 are placed on the mounting portion 49, the charging pad 3 can specify the coordinates of each of the mobile terminals 2. The mobile terminals 2 are usually charged in chronological order in which the positions of the mobile terminals 2 have been detected.

<Method of Setting Charge Order for the Mobile Terminals 2>

Next, a charge order setting method will be described with reference to FIGS. 9 and 10A to 10B.

FIG. 9 illustrates an exemplary operation of the mobile terminal 2.

After the mobile terminal 2 has been place on the charging pad 3, an application used to reset a charge order is launched. A user touches icons on display screens of mobile terminals in the order in which the user wants to charge the mobile terminals.

The control unit 12 in the mobile terminal 2 placed on the charging pad 3 detects whether the icon displayed on the display unit 11 has been touched by an object (step S1). In a case where the control unit 12 detects that the icon has not been touched by an object, the process proceeds to step S4.

On the other hand, in a case where the control unit 12 detects that the icon has been touched by an object, the switch 21 turns off the capacitor 20 used for position detection under the control of the control unit 12 so as to disconnect the power receiving coil 17 from the charge control unit 13 (step S2). As a result, although the mobile terminal 2 is physically present on the charging pad 3, it is detected that the mobile terminal 2 has been removed from the charging pad 3.

Subsequently, the switch 21 turns on the capacitor 20 so as to connect the power receiving coil 17 and the charge control unit 13 under the control of the control unit 12 (step S3). As a result, it is detected that the mobile terminal 2 has been replaced on the charging pad 3. A charge order is set in the order in which the mobile terminals 2 have been placed.

As described previously, in order to cause the charging pad 3 to recognize that the mobile terminal 2 has been placed on the charging pad 3 for the first time, the charge control unit 13 causes the switch 21 to turn on and off the capacitor 20. As a result of this control processing, the charging pad 3 recognizes that the mobile terminal 2 is the latest mobile terminal 2 that has been placed on the charging pad 3.

Subsequently, the charge control unit 13 determines whether the charging of the secondary battery 14 has been completed on the basis of, for example, a charge voltage for the secondary battery 14 received from the charging unit 33 (step S4). When charging is being performed, the process returns to step S1 and the touch operation determination processing is repeated. On the other hand, when charging has been completed, the charge control unit 13 transmits a charging termination command to the charging unit 33 so as to prevent overcharging of the secondary battery 14 (step S5).

Figure 10A:
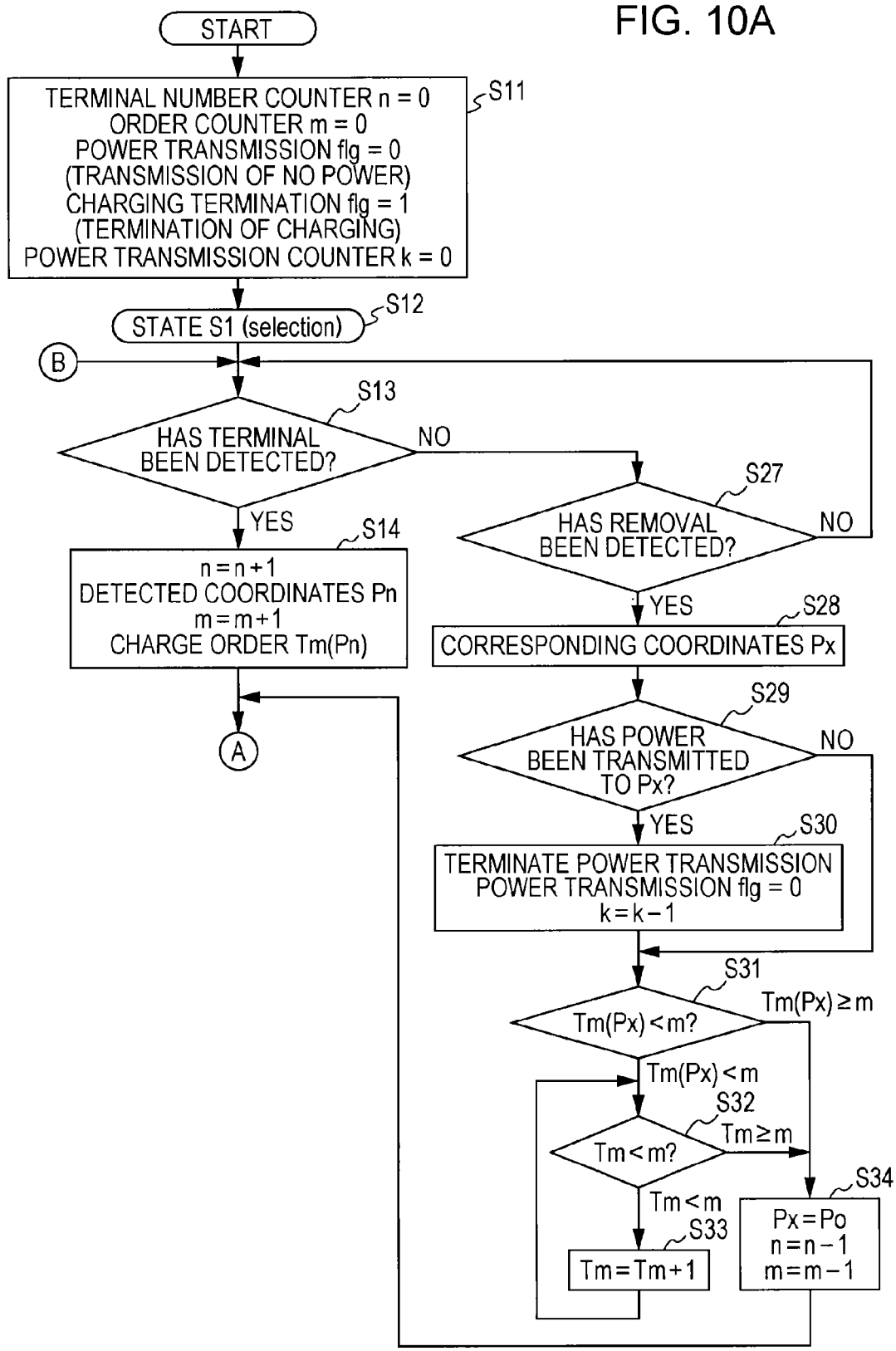

FIGS. 10A and 10B illustrate an exemplary operation of the charging pad 3.

First, the control unit 46 in the charging pad 3 performs the initial setting of parameters (step S11). Initialized parameters and initial values include, for example, a terminal number counter n=0, an order counter m=0, a power transmission flg (flag)=0 (non-transmission), a charging termination flg=1 (termination of charging), and a power transmission counter k=0.

The terminal number counter n indicates the number of the mobile terminals 2 placed on the charging pad 3. The order counter m indicates a charge order. The power transmission flg indicates whether the charging pad 3 transmits power to the mobile terminal 2. The charging termination flg indicates whether charging has been completed. The power transmission counter k indicates the number of transmissions of power to the mobile terminal 2.

Subsequently, after the control unit 46 has been brought into the state S1 (selection) (step S12), the control unit 46 detects whether the mobile terminal 2 has been placed on the charging pad 3 (step S13). In a case where the control unit 46 detects that the mobile terminal 2 has not been placed on the charging pad 3, the process proceeds to step S27.

On the other hand, in a case where the control unit 46 detects that the mobile terminal 2 has been placed on the charging pad 3, the control unit 46 stores values of detected coordinates as coordinates Pn, increments the terminal number counter n and the order counter m by one, and stores the coordinates Pn in a charge order function Tm used to determine a charge order (step S14). As a result the mobile terminal 2 is assigned a charge order on the basis of the order in which the mobile terminals 2 have been placed on the charging pad 3.

Subsequently, the control unit 46 determines whether the power transmission flg set for the charging pad 3 is zero (the power transmission flg=0) so as to check the state of the power transmission fig (step S15). The equation of the power transmission flg=0 indicates that no power is transmitted to the mobile terminal 2 (non-transmission of power), and the equation of the power transmission flg=1 indicates that power is transmitted to the mobile terminal 2. In a case where it is determined that the equation of the power transmission flg=1 is set, that is, power transmission is being performed, the current transmission of power to the mobile terminal 2 is preferentially performed even when the control unit 46 detects another mobile terminal 2. Accordingly, the process proceeds to step S23.

On the other hand, in a case where it is determined that the equation of the power transmission flg=0 is set, that is, power transmission is not performed, the control unit 46 determines whether the equation of the charging termination flg=1 is set so as to determine which of the mobile terminal 2 assigned the first charge order and the mobile terminal 2 assigned the next charge order will be charged (step S16). The equation of the charging termination flg=0 indicates that a charging termination command is not received and charging is being performed, and the equation of the charging termination flg=1 indicates that charging has been completed. In a case where the equation of the charging termination flg=0 is set, that is, charging is being performed, the power transmission counter k is set to one (step S18) and the process proceeds to step S19.

On the other hand, in a case where the equation of the charging termination flg=1 is set and charging has been completed, the control unit 46 increments the power transmission counter k by one (step S17) and performs power transmission setting for the mobile terminal 2 assigned the next charge order.

Subsequently, the control unit 46 compares the power transmission counter k and the order counter m with each other and determines whether the inequality of the power transmission counter k<the order counter m is set so as to determine whether power has been transmitted to all of the mobile terminals 2 placed on the charging pad 3 (step S19). The inequality of the power transmission counter k<the order counter m indicates that the mobile terminal 2 waiting its turn is present, and the inequality of the power transmission counter k≥the order counter m indicates that the charging of all of the mobile terminals 2 waiting their turns has been completed.

In a case where the inequality of the power transmission counter k the order counter m is set, the charging of all of the mobile terminals 2 waiting their turns has been completed. Accordingly, the process returns to step S13 in which the control unit 46 searches for another mobile terminal 2 waiting for charging. On the other hand, the inequality of the power transmission counter k<the order counter m is set, the mobile terminal 2 waiting its turn is present. Accordingly, the power transmission coil 44 is moved to a position of the mobile terminal 2 which is specified with coordinates Px of the mobile terminal 2 stored in a charge order function Tk (step S20).

Subsequently, the control unit 46 is brought into the state S2 (ping) (step S21), the state S3 (identification & configuration) (step S22), and the state S4 (power transfer) (step S23). As a result, the control unit 46 starts to transmit power to the mobile terminal 2 so as to charge the mobile terminal 2.

In the state S4 in step S23, the control unit 46 determines whether a charging termination command has been received from the mobile terminal 2 (step S24). In a case where the charging termination command has not been received, the control unit 46 sets the power transmission fig to one (the charging termination flg=1) (step S26) and the process returns to step S24 in which the control unit 46 continues charging of the mobile terminal 2. On the other hand, in a case where the charging termination command has been received, the control unit 46 sets the charging termination flg to one (the charging termination flg=1) and the power transmission flg to zero (the charging termination flg=0) (step S25) and the process returns to step S16 in which the control unit 46 transmits power to the mobile terminal 2 assigned with the next charge order.

In a case where the control unit 46 detects that the mobile terminal 2 has not been placed on the charging pad 3 in step S13, the control unit 46 determines whether the mobile terminal 2 has been removed from the charging pad 3 (step S27). In a case where the removal of the mobile terminal 2 from the charging pad 3 is not detected, the process returns to step S13 in which the control unit 46 repeats the processing for detecting the mobile terminal 2.

On the other hand, in a case where the removal of the mobile terminal 2 from the charging pad 3 is detected, the control unit 46 specifies coordinates Px on the charging pad 3 at which the mobile terminal 2 has been present before the removal (step S28). The control unit 46 determines whether power has been transmitted to the mobile terminal 2 placed at the coordinates Px before the removal (step S29). In a case where the transmission of power to the mobile terminal 2 has been stopped, the control unit 46 proceeds to step S31.

On the other hand, in a case where power has been transmitted to the mobile terminal 2 before the removal from the charging pad 3, the control unit 46 stops power transmission, sets the power transmission flg to zero (the power transmission flg=0), and decrements the power transmission counter k by one so as to transmit power to the mobile terminal 2 assigned the next charge order (step S30).

Subsequently, the control unit 46 determines whether the inequality of a charge order Tm (Px) corresponding to the coordinates Px<the order counter m is set (step S31). The determination of whether the inequality of the charge order function Tm (Px)<the order counter m is set is equivalent to the comparison between the number of the mobile terminals 2 at the coordinates Px stored in the charge order function Tm and the order counter m. In the case of Tm (Px) m, the control unit 46 proceeds to step S34.

On the other hand, in the case of Tm (Px)<m, the control unit 46 determines whether the inequality of a charge order Tm<m (step S32). While the condition of the charge order Tm<m is satisfied, the control unit 46 substitutes the next charge order Tm+1 into the charge order Tm so as to move up orders set for the following mobile terminals 2. In a case where the inequality of the charge order function Tm≥m is set, the control unit 46 proceeds to step S34. On the other hand, in a case where the inequality of the charge order function Tm<m is set, the control unit 46 adds one to Tm (step S33) and proceeds to step S32.

In a case where the inequality of Tm (Px)≥m is set in step S31 or the inequality of Tm≥m is set in step S32, an initial value $P_0$ is substituted into the coordinates Px on the charging pad 3 from which the mobile terminal 2 has been removed and the terminal number counter n and the order counter m are decremented by one (step S34). Subsequently, the process proceeds to step S15 in which the control unit 46 checks the value of the power transmission fig again.

In all of the states S1, S2, S3, and S4 of the control unit 46, the terminal detection processing in step S13 and the removal detection processing in step S27 are performed. Accordingly, the control unit 46 can quickly detect the placement of the mobile terminal 2 on the charging pad 3 or the removal of the mobile terminal 2 from the charging pad 3.

When a user touches an icon displayed on the display unit 11 in one of a plurality of mobile terminals 2 placed on the mounting portion 49 of the charging pad 3, the touch panel 10 notifies the control unit 12 of information about the selected icon and the mobile terminal 2 transmits to the charging pad 3 information indicating that the mobile terminal 2 has been replaced on the charging pad 3. The charging pad 3 according to the first exemplary embodiment can change a charge order set for the mobile terminal 2. Accordingly, the user does not have to replace the mobile terminal 2. Thus, even after a plurality of mobile terminals 2 have been placed on the mounting portion 49 and the charge order in which the mobile terminals 2 are charged has been determined, it is possible to easily change the charge order.

Upon detecting that the touch panel 10 has been touched by an object, the control unit 12 in the mobile terminal 2 turns off the switch 21 and then turns on the switch 21 again. As a result, it is possible to cause the charging pad 3 to believe that the mobile terminal 2 has been removed once and then been replaced on the charging pad 3.

The mobile terminal 2 and the charging pad 3 are brought into one of the states S1 to S4 in accordance with the noncontact charging operation sequence illustrated in FIG. 6. The charging pad 3 always monitors the state of power transmission from the charging pad 3 to the mobile terminal 2 on the basis of a response received from the mobile terminal 2, and quickly stops power transmission at the time of occurrence of unnecessary power transmission. As a result, it is possible to prevent the mobile terminal 2 from being fully charged and prevent the occurrence of unnecessary power transmission to the mobile terminal 2 removed from the charging pad 3. This leads to a power saving.

2. Second Exemplary Embodiment

[Example of Changing Charge Order by Tapping Mobile Terminal or Writing Charge Order on Touch Panel]

Next, the noncontact charging system 1 according to the second exemplary embodiment of the present disclosure will be described with reference to FIGS. 11A to 14B. An operation method of changing a charge order by tapping the mobile terminal 2 placed on the charging pad 3 with a finger or writing a number on the display unit 11 will be described. In the following description, the same reference numerals are used to identify parts already described in the first embodiment, and the detailed description thereof will be therefore omitted.

FIGS. 11A to 11E illustrate a display example on the display unit 11 in a case where a charge order is set for the mobile terminal 2. FIG. 11A illustrates an icon displayed on the display unit 11 in a state in which the mobile terminal 2 is placed on the charging pad 3. FIG. 11B illustrates a state in which the icon is touched by a finger of a user. FIG. 11C illustrates an example in which an application program for changing a charge order in accordance with a number written on the touch panel 10 by the user or the number of taps given by the user is launched. FIG. 11D illustrates an example in which a new charge order is set for the mobile terminal 2 on the basis of the order in which the mobile terminals 2 have been tapped. FIG. 11E illustrates an exemplary order in which the mobile terminals 2 have been placed and an exemplary order in which icons have been tapped.

The control unit 12 in the mobile terminal 2 according to the second exemplary embodiment performs control processing for transmitting to the charging pad 3 a charge order change instruction input with the touch panel 10. When a specific icon displayed on the display unit 11 is touched during charging performed by the charging pad 3, a charge order change application program is launched in accordance with the number of taps of a user on the touch panel 10. After the charge order change application program has been launched, the user writes a charge order on the touch panel 10 with a finger or an object such as stylus as a charge order change instruction or taps the touch panel 10 one or more times corresponding to the charge order. At that time, a changed charge order is displayed on the display unit 11. The control unit 46 in the charging pad 3 specifies the number written on the touch panel 10 or the number of taps on the touch panel as the charge order change instruction.

The order in which the mobile terminals 2 have been placed on the charging pad 3 is 2-3, 2-1, and 2-2. The order of charging performed by the charging pad 3, which has been set on the basis of the placement order, is changed to 2-2, 2-1, and 2-3. Each of the mobile terminals 2 transmits a charge order set by the charge order change application program to the charging pad 3. Upon receiving the changed charge orders from the mobile terminals 2, the charging pad 3 moves the power transmission coil 44 to the mobile terminals 2 in order of precedence so as to transmit power to the mobile terminals 2.

<Exemplary Operation of the Mobile Terminal 2>

Figure 12:
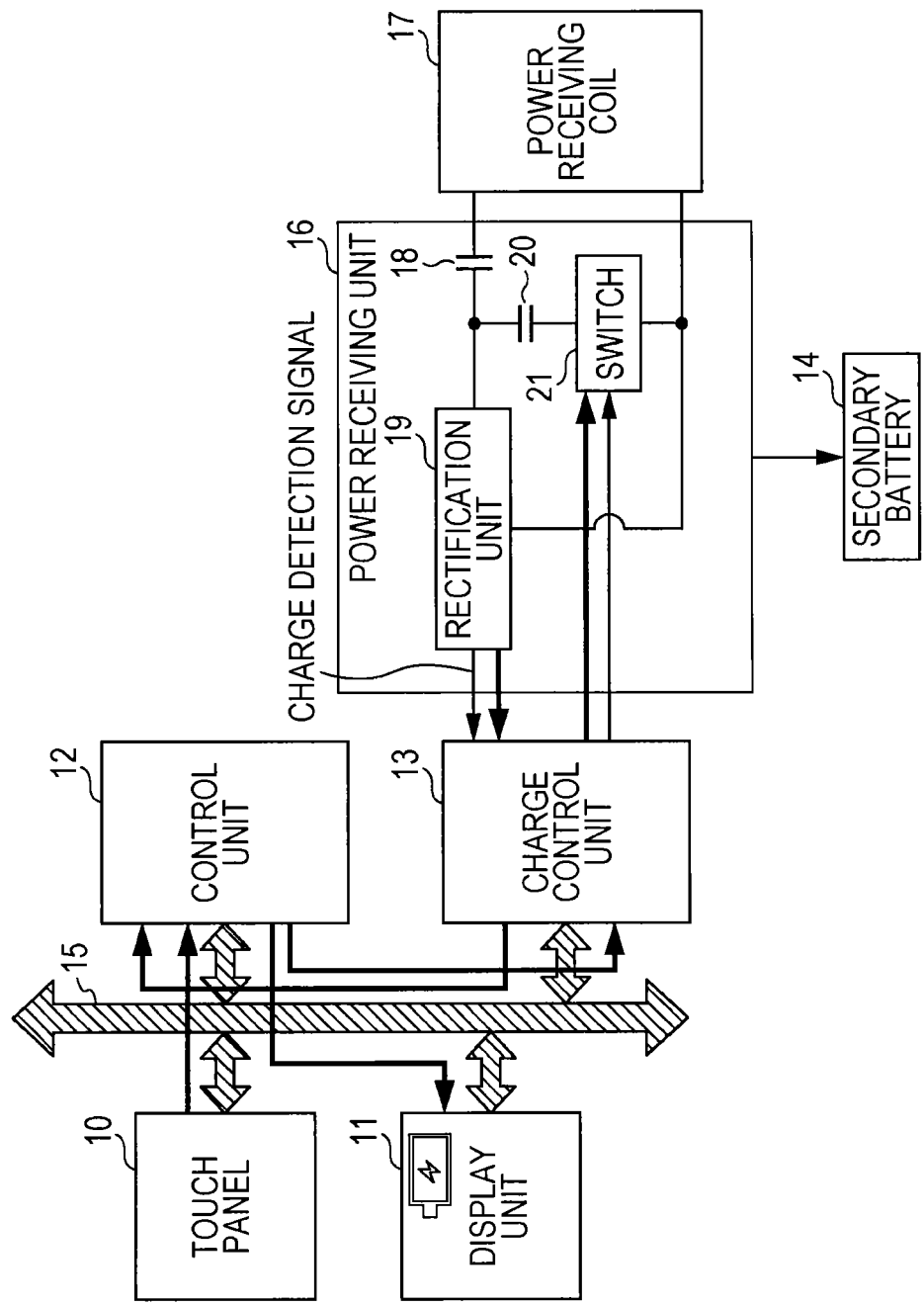
FIG. 12 is a block diagram illustrating an exemplary operation of a mobile terminal according to the second exemplary embodiment of the present disclosure at the time of noncontact charging.

FIG. 12 illustrates an exemplary operation of the mobile terminal 2 at the time of noncontact charging.

The control unit 12 displays an icon indicating that charging is being performed on the display unit 11 (FIG. 11A). When the icon displayed on the display unit 11 is touched (FIG. 11B), the control unit 12 recognizes that the icon has been touched on the basis of a position detection signal received from the touch panel 10 and launches a charge order change application program for changing a charge order (FIG. 11C).

Subsequently, the touch panel 10 transmits to the control unit 12 information about the number of taps on the mobile terminal 2 or a number or the like written on the touch panel 10, and the control unit 12 transmits a charge order change instruction to the charge control unit 13. At that time, the control unit 12 outputs to the charge control unit 13 a command for switching between ON and OFF states of the switch 21. Upon receiving the command from the control unit 12, the charge control unit 13 performs control processing for switching between ON and OFF states of the switch 21. Subsequently, the power receiving unit 16 starts to charge the secondary battery 14 on the basis of a determined charge order.

Thus, when the touch panel 10 of the mobile terminal 2 placed on the charging pad 3 is tapped or a charge order is written on the touch panel 10, the secondary battery 14 included in the mobile terminal 2 is charged on the basis of the changed charge order. After the charging of the mobile terminal 2 has been completed, another mobile terminal 2 is charged.

Figure 13:
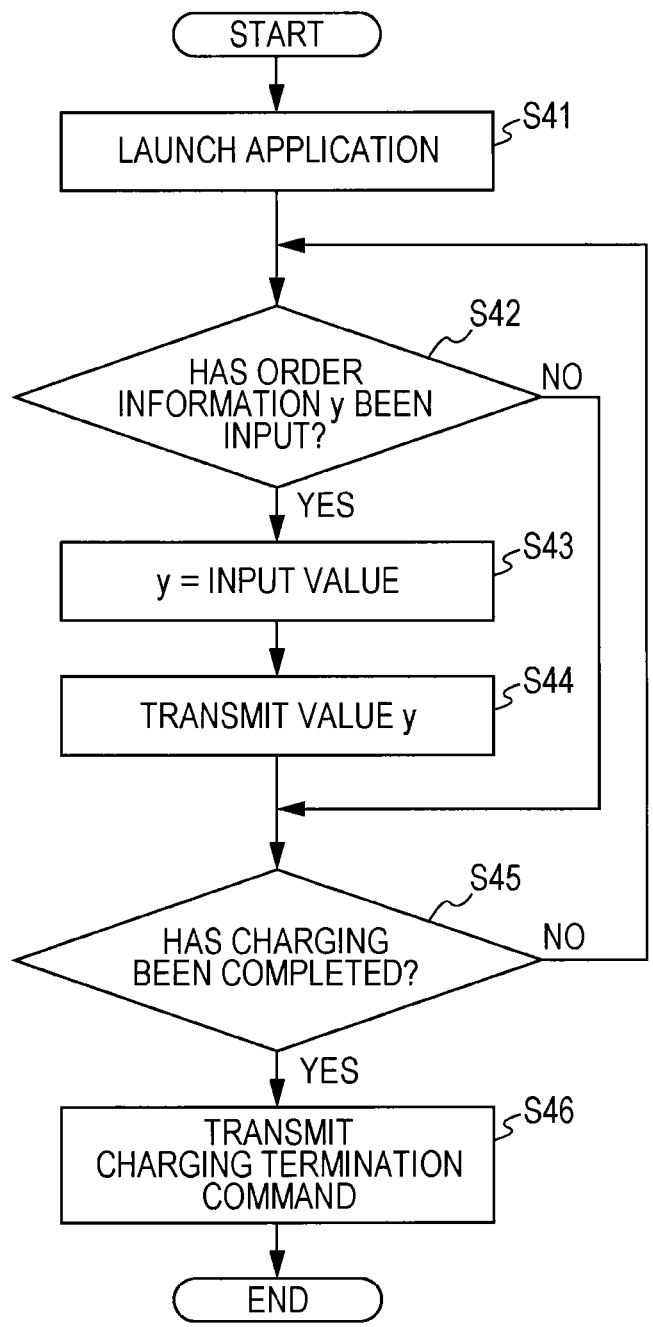
FIG. 13 is a flowchart illustrating an exemplary operation of a mobile terminal according to the second exemplary embodiment of the present disclosure.

FIG. 13 illustrates an exemplary operation of the mobile terminal 2.

After the mobile terminal 2 has been placed on the charging pad 3, the control unit 12 detects a pulsing position detection signal output from the charging pad 3. Upon receiving the position detection signal, the control unit 12 launches the charge order change application program (step S41). At that time, an icon indicating that charging is being performed is displayed on the display unit 11.

Subsequently, a user writes a charge order on the touch panel 10 of the mobile terminal 2 or taps the touch panel 10 so as to input order information y representing a charge order. At that time, the control unit 12 determines whether the order information y has been appropriately input from the touch panel 10 (step S42). When the order information y has not been input, the control unit 12 proceeds to step S45.

On the other hand, when the order information y has been input, the control unit 12 recognizes that a value represented by the order information y is a charge order change instruction (step S43). The control unit 12 transmits the value represented by the order information y to the charging pad 3 via the charge control unit 13, the power receiving unit 16, and the power receiving coil 17 so as to cause the charging pad 3 to perform charging on the basis of the changed charge order (step S44).

Subsequently, the charge control unit 13 determines whether the charging of the secondary battery 14 has been completed on the basis of, for example, a charge voltage for the secondary battery 14 received from the charging unit 33 (step S45). When charging is being performed, the process returns to step S41 and the determination of whether the order information y has been input is repeated. On the other hand, when charging has been completed, the charge control unit 13 transmits a charging termination command to the charging unit 33 so as to prevent overcharging of the secondary battery 14 (step S46). The charging process performed in the charging the mobile terminal 2 ends.

Figure 14A:
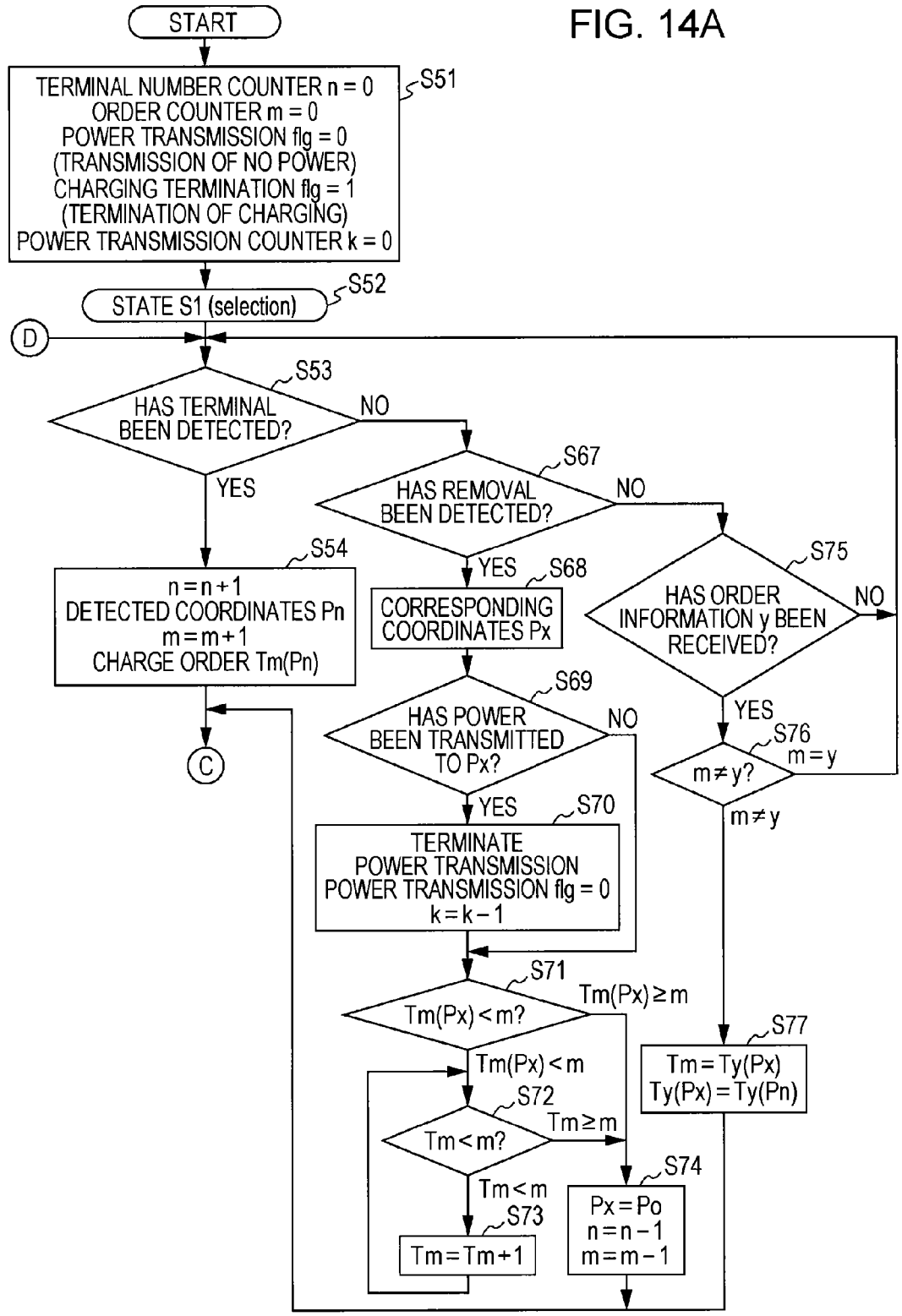
FIGS. 14A-14B is a flowchart illustrating an exemplary operation of a charging pad according to the second exemplary embodiment of the present disclosure.
Figure 14B:
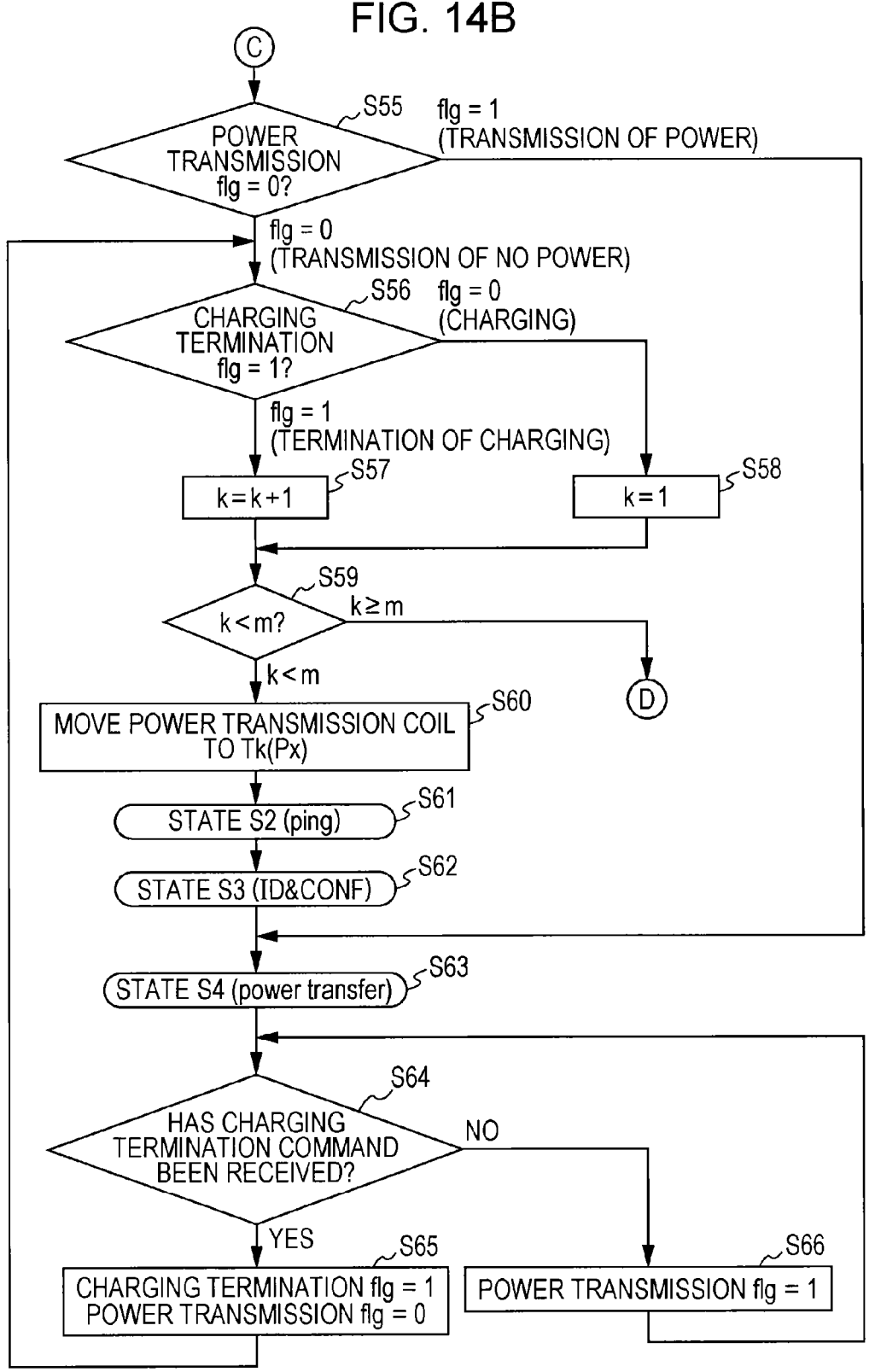

FIGS. 14A and 14B illustrate an exemplary operation of the charging pad 3.

The process from steps S51 to S74 in FIG. 14A is the same as the above-described process from steps S11 to S34 in FIG. 10A, and the detailed description thereof will be therefore omitted.

In a case where the control unit 46 detects that the mobile terminal 2 has not been removed from the charging pad 3 in step S67, the control unit 46 determines whether the order information y has been received from the mobile terminal 2 (step S75). When the order information y has not been received, the process proceeds to step S53 in which the control unit 46 repeats the detection of the mobile terminal 2.

In a case where the control unit 46 determines that the order information y has been received, the control unit 46 compares the order counter m set for the mobile terminal 2 placed at coordinates on the charging pad 3 from which the order information y has been transmitted and the order information y with each other (step S76). When the order counter m and the order information y are the same, the process proceeds to step S53 in which the control unit 46 repeats the detection of the mobile terminal 2.

When the order counter m and the order information y are not the same, the control unit 46 substitutes coordinates Px set in advance as a Ty-th charging target into a charge order Tm and substitutes coordinates Pn at which the power transmission coil is present into Ty. The control unit 46 changes the charge order set for the mobile terminal 2 from which the order information y has been received to the Ty-th order, and performs setting processing so as to allow the power transmission coil to move to Tm (step S77).

When new charge orders are written on a plurality of mobile terminals 2 placed on the mounting portion 49 or the mobile terminals 2 are tapped after the charge order change application program has been launched in the mobile terminals 2, the charging pad 3 according to the second exemplary embodiment can easily change the charge order in which the mobile terminals 2 are charged. Since a charge order is displayed on the display unit 11, a user can easily recognize the changed charge order. Even in a case where a charge order is input by mistake, a user can quickly realize the mistake and can easily change the charge order to a desired charge order.

3. Third Exemplary Embodiment

[Example of Changing Charge Order by Changing Arrangement of Mobile Terminals Placed on Charging Pad]

Next, the noncontact charging system 1 according to the third exemplary embodiment of the present disclosure will be described with reference to FIGS. 15A to 17B. A method of changing a charge order on the basis of the positional relationship among the mobile terminals 2 on the charging pad 3 (the distances of the mobile terminals 2 from a reference point) after the rearrangement of the mobile terminals 2 will be described. In the following description, the same reference numerals are used to identify parts already described in the first embodiment, and the detailed description thereof will be therefore omitted.

FIGS. 15A and 15B illustrate an example in which the mobile terminals 2 are placed on the charging pad 3. FIG. 15A illustrates exemplary placement of the mobile terminals 2. FIG. 15B illustrates exemplary movement of the mobile terminals 2 on the charging pad 3.

As illustrated in FIG. 15A, a charge order is determined on the basis of the order in which the mobile terminals 2 have been placed on the charging pad 3 (the order of 2-1 to 2-3). Here, the mobile terminal 2 assigned the identifier of 2-3 is moved to a position having an x coordinate that is smaller than that of the mobile terminal 2 assigned the identifier of 2-1, and the mobile terminals 2 assigned the identifiers of 2-1 and 2-2 are moved to positions having larger x coordinates. For convenience of explanation, stars used to measure a distance to a reference point 0 are illustrated on the mobile terminals 2. For example, this star represents the position of the power receiving coil 17 included in the mobile terminal 2. It is apparent from the drawing that the distance between the reference point 0 and the star is increased in the order of 2-1 to 2-3.

As illustrated in FIG. 15B, the mobile terminals 2 are rearranged so that the order of 2-3, 2-1, and 2-2 is obtained from a smaller value to a larger value of the x coordinate. It is apparent from the drawing that the distance between the reference point 0 and the star is increased in the order of 2-3, 2-1, and 2-2. The control unit 46 in the charging pad 3 specifies charge order change instructions on the basis of the distances between the reference point and positions detected by the position detection unit 50 after the rearrangement of a plurality of mobile terminals 2 on the mounting portion. At that time, the control unit 46 changes the charge order to the order of 2-3, 2-1, and 2-2.

Figure 16:
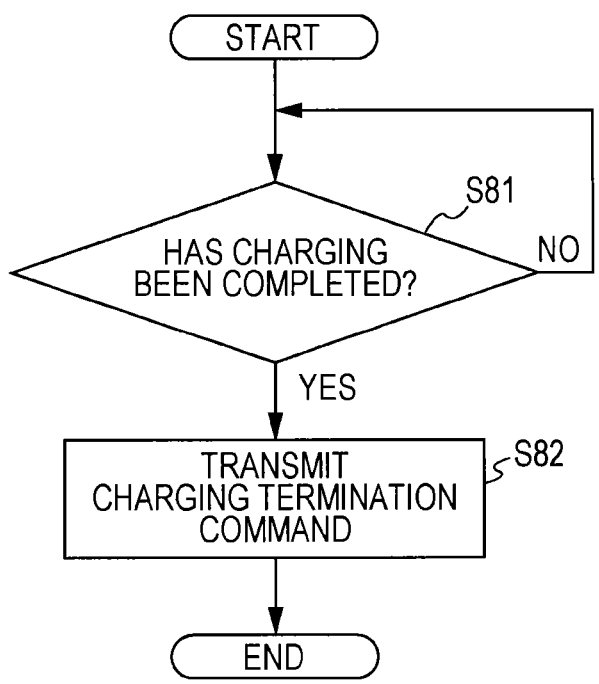
FIG. 16 is a flowchart illustrating an exemplary operation of a mobile terminal that is the third modification of the present disclosure.

FIG. 16 illustrates an exemplary operation of the mobile terminal 2.

After the mobile terminal 2 has been placed on the charging pad 3, the mobile terminal 2 detects a position detection signal output from the charging pad 3. At that time, an icon indicating that charging is being performed is displayed on the display unit 11. The control unit 12 determines whether charging has been completed (step S81). When charging is being performed, the process returns to step S81 in which the control unit 12 repeats the determination processing.

When charging has been completed, the control unit 12 transmits a charging termination command (step S82). The charging process performed in the mobile terminal 2 ends.

Figure 17A:
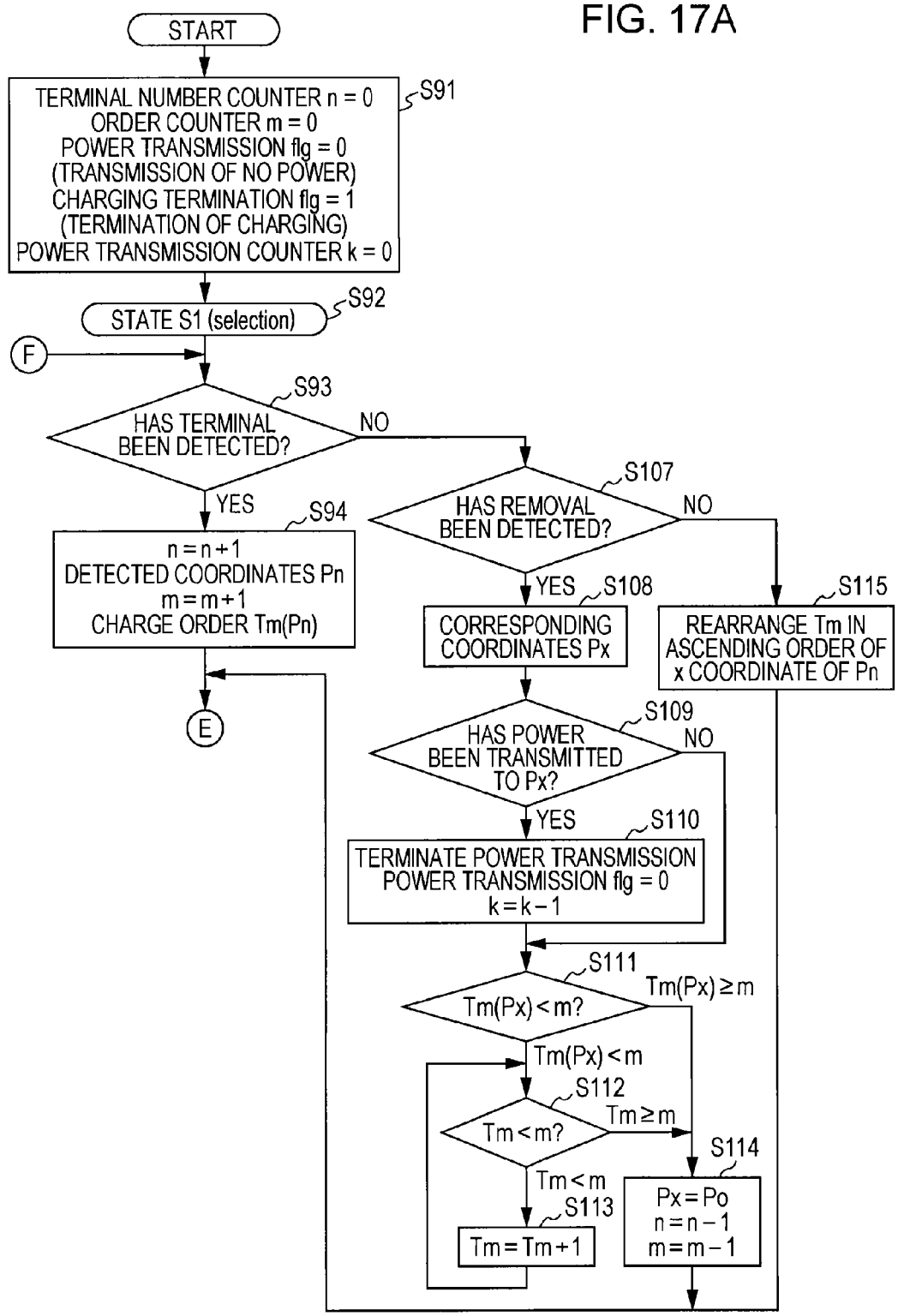
FIGS. 17A-17B is a flowchart illustrating an exemplary operation of a charging pad according to a third exemplary embodiment of the present disclosure.
Figure 17B:
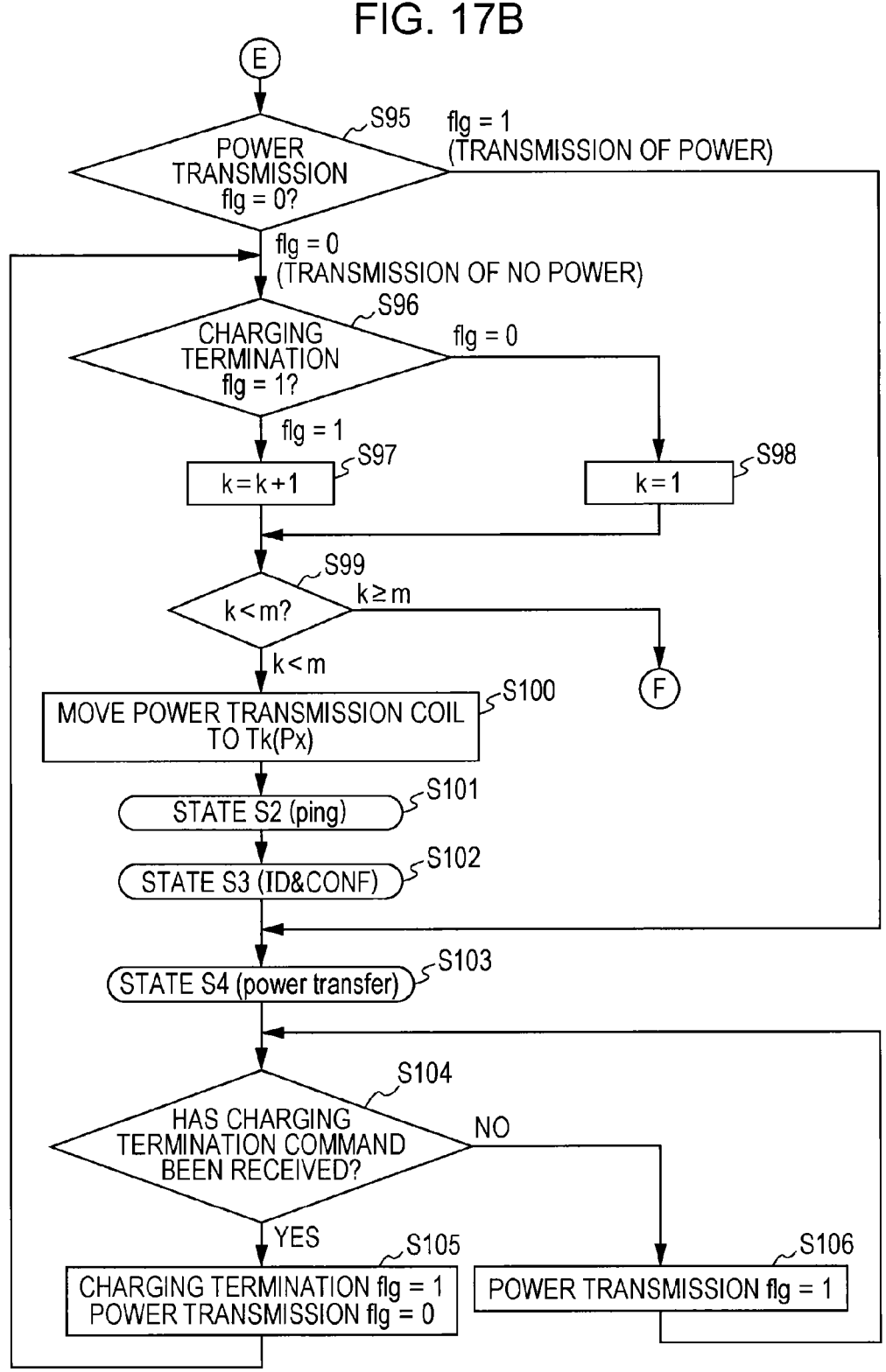

FIG. 17 illustrates an exemplary operation of the charging pad 3.

The process from steps S91 to S114 in FIG. 17 is substantially the same as the above-described process from steps S11 to S34 in FIG. 10A, and the detailed description thereof will be therefore omitted.

In step S107, the control unit 46 determines whether the mobile terminal 2 has been removed from the charging pad 3. When detecting that the mobile terminal 2 has not been removed from the charging pad 3, the control unit 46 rearranges Tm in ascending order of x coordinates included in all coordinates Pn detected by the charging pad 3 (step S115). Subsequently, the process proceeds to step S95 and the control unit 46 repeats the processing for transmitting power to the mobile terminal 2.

Thus, in order to change a charge order, the positions of a plurality of mobile terminals 2 are changed. The charging pad 3 according to the third exemplary embodiment can easily change the charge order in which the mobile terminals 2 are charged. By displaying a mark or the like at a position corresponding to a reference point of the mounting portion 49, it is possible to allow a user to easily understand the distance between the referent point and the mobile terminal 2. The reference point may be moved in the x or y direction as appropriate.

4. Fourth Exemplary Embodiment

[Example of Performing Charging while Keeping Charge Order Set in Advance in Case where Mobile Terminal Falls from Charging Pad and IS Replaced on Charging Pad]

Figure 18A:
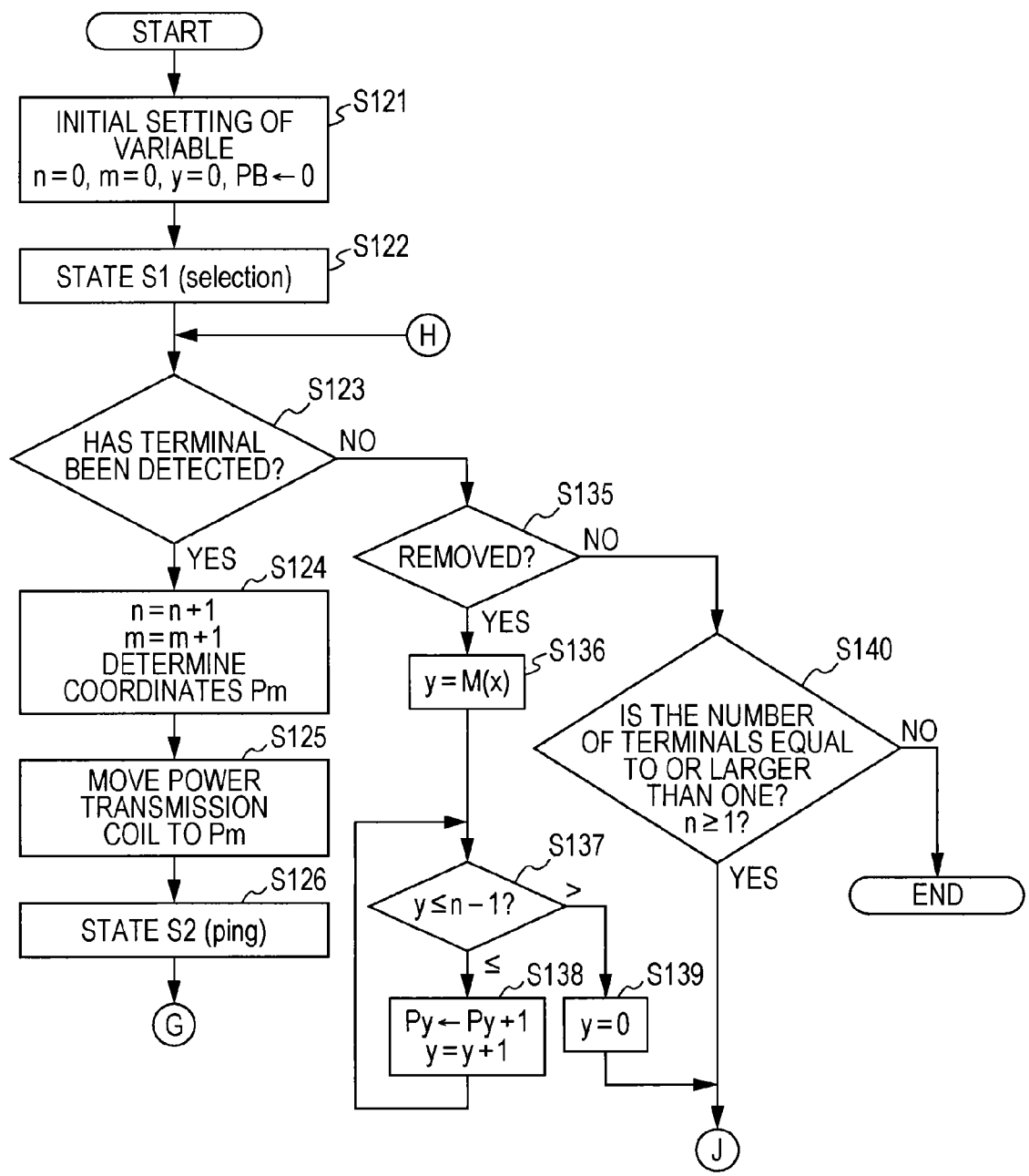
FIGS. 18A and 18B is a first flowchart illustrating an exemplary operation of a charging pad according to a fourth exemplary embodiment of the present disclosure.
Figure 18B:
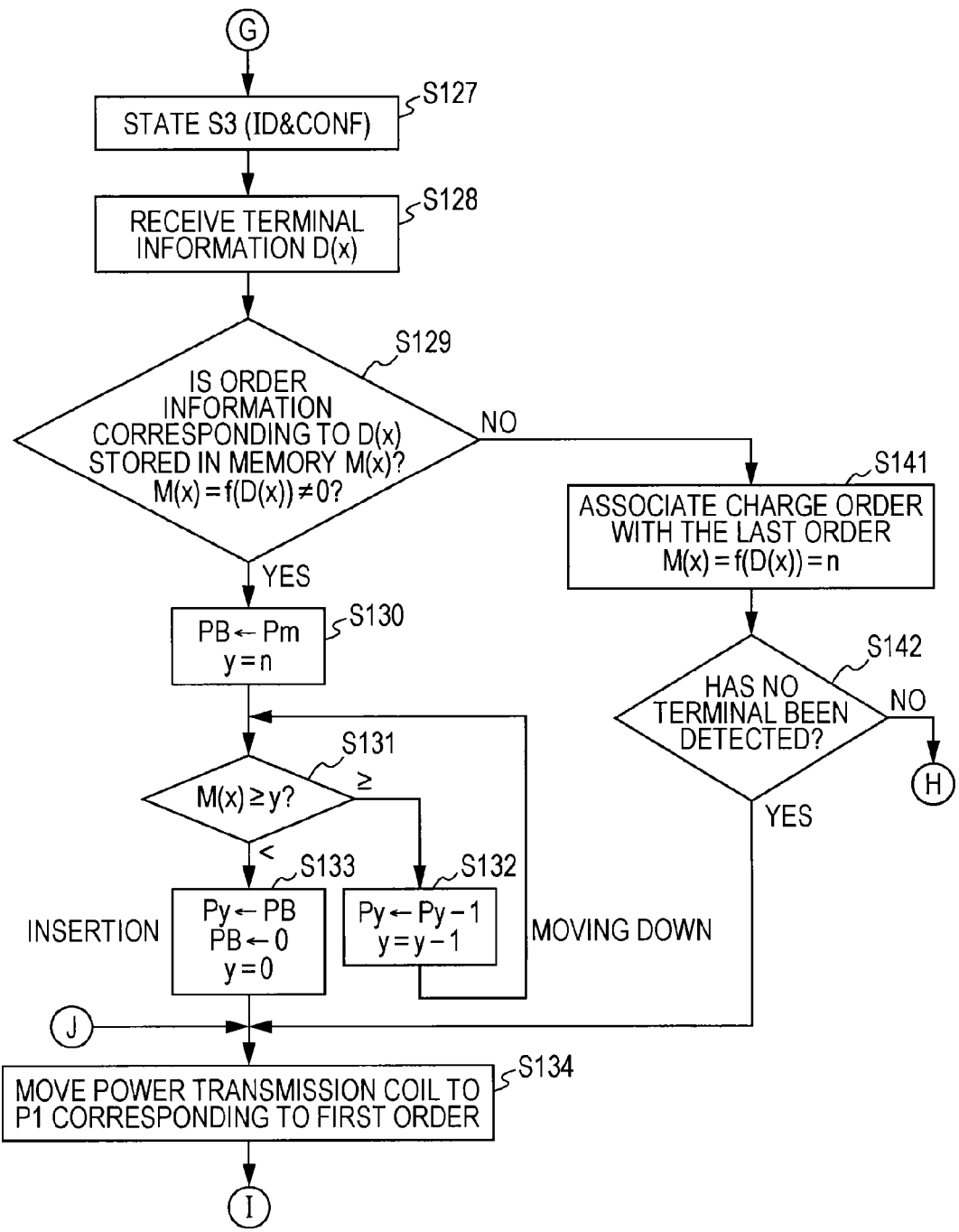
Figure 19:
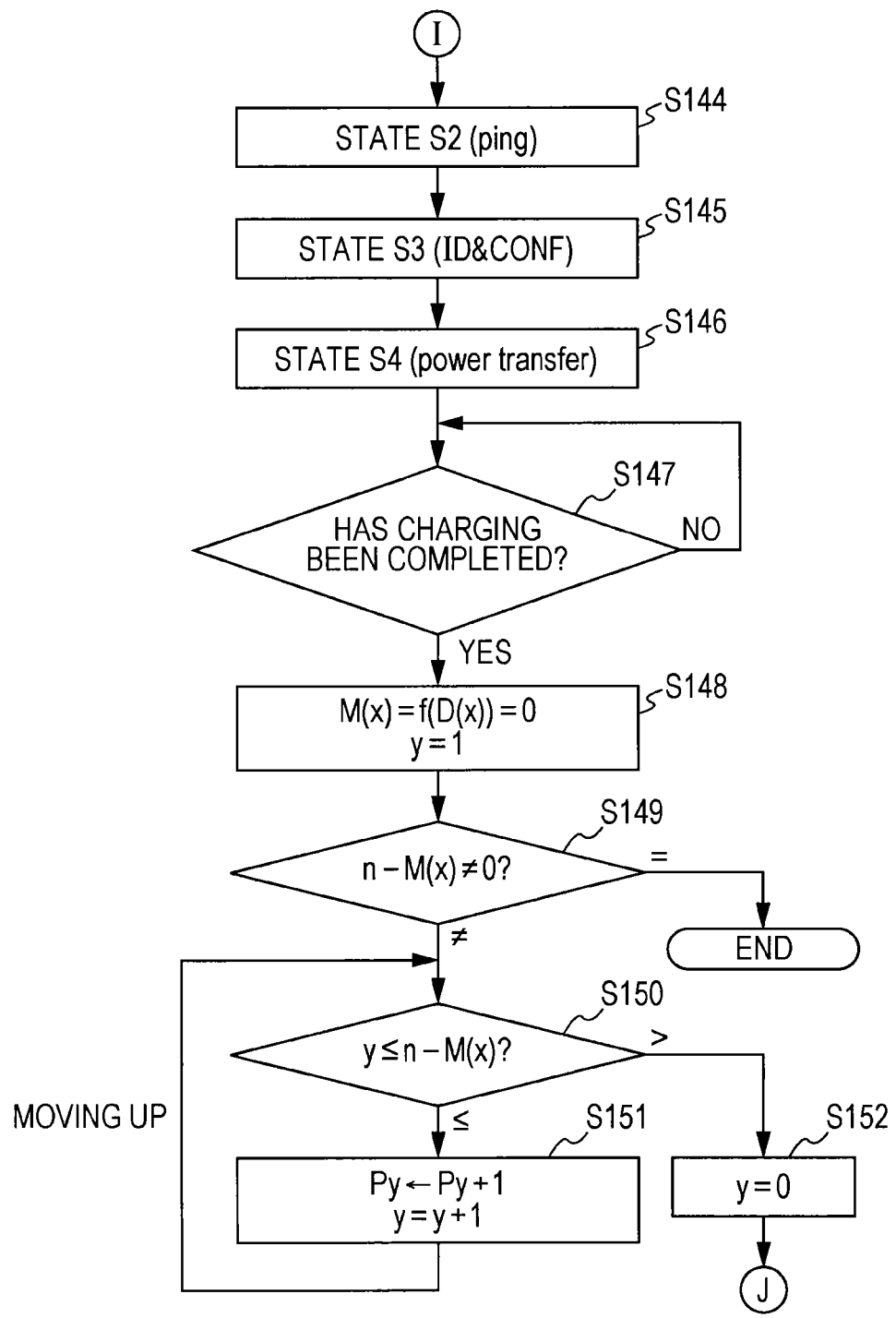
FIG. 19 is a second flowchart illustrating an exemplary operation of a charging pad according to the fourth exemplary embodiment of the present disclosure.
Figure 20:
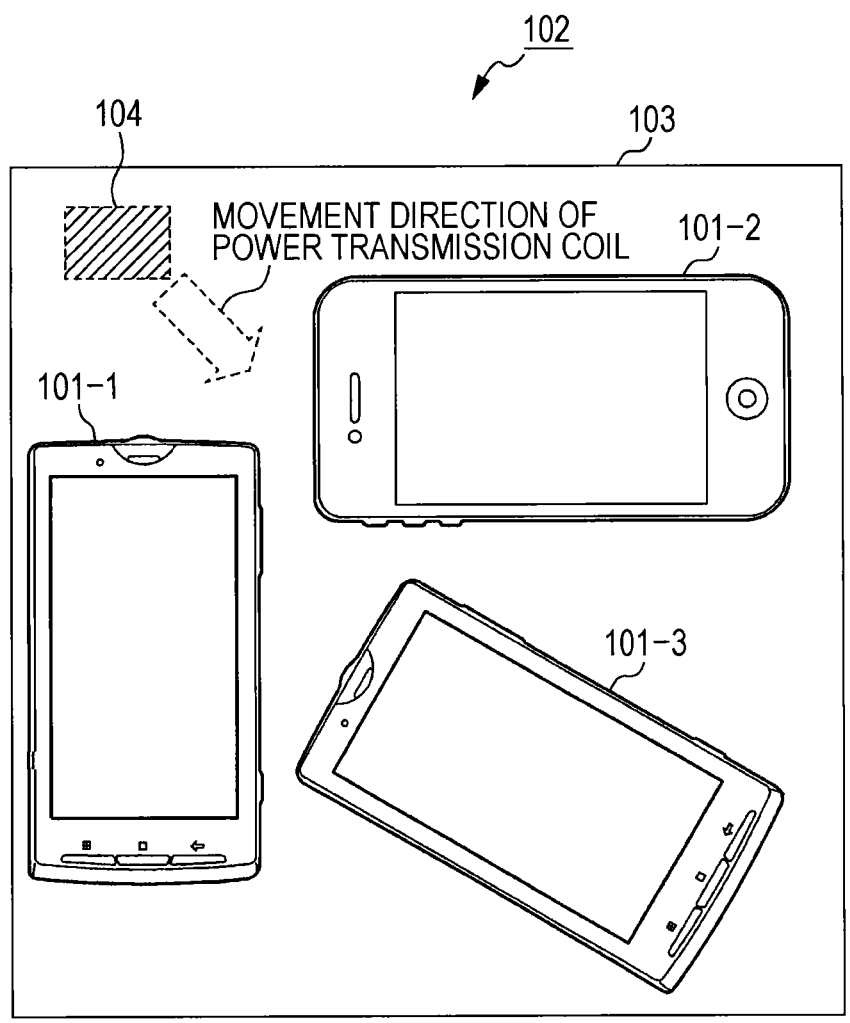
FIG. 20 is a diagram describing a state in which a charging apparatus in the related art charges a plurality of mobile terminals.

Next, the noncontact charging system 1 according to the fourth exemplary embodiment of the present disclosure will be described with reference to FIGS. 18A to 19. A method of performing charging in a charge order set in advance even in a case where the mobile terminal 2 falls from the charging pad 3 and is replaced on the charging pad 3 will be described. In the following description, the same reference numerals are used to identify parts already described in the first embodiment, and the detailed description thereof will be therefore omitted.

FIG. 18 is a first flowchart illustrating an exemplary operation of the charging pad 3. FIG. 19 is a second flowchart illustrating an exemplary operation of the charging pad 3.

The control unit 46 in the charging pad 3 stores the charge order of a plurality of mobile terminals 2 placed on the mounting portion 49, and changes the charge order after one of the mobile terminals 2 has been removed from the mounting portion 49. In a case where the mobile terminal 2 is replaced on the mounting portion 49, the control unit 46 can change the changed charge order to the stored original charge order and charge the mobile terminals 2. A detailed exemplary process will be described.

First, the control unit 46 in the charging pad 3 performs initial setting of variables (step S121) and is brought into the state S1 (Selection) (step S122). The variables include a variable y used as a general-purpose counter and coordinates (buffer) PB used as a temporal data storage buffer in addition to the terminal number counter n and the order counter m which have been described previously.

Subsequently, the control unit 46 detects whether the mobile terminal 2 has been placed on the charging pad 3 (step S123). In a case where the control unit 46 detects that the mobile terminal 2 has not been placed on the charging pad 3, the process proceeds to step S135.

On the other hand, in a case where the control unit 46 detects that the mobile terminal 2 has been placed on the charging pad 3, the control unit 46 increments the terminal number counter n and the order counter m by one and specifies coordinates Pm of the placed mobile terminal 2 (step S124).

Subsequently, the control unit 46 moves the power transmission coil 44 to the coordinates Pm (step S125), is brought into the state 2 (Ping) (step S126) and the state 3 (ID & CONF) (step S127), and receives terminal information D(x) from the mobile terminal 2 (step S128). The "x" in the terminal information D(x) is, for example, a model name, a part of a manufacturer's serial number, a part of an IC card number, or a part of a telephone number of the mobile terminal 2 or a part of a manufacturer's serial number of a battery pack.

Subsequently, the control unit 46 checks whether order information corresponding to the terminal information D(x) is stored in a memory M(x) (not illustrated) (step S129). When the order information is stored, the control unit 46 temporarily saves the coordinates Pm in the coordinates (buffer) PB and assigns the terminal number counter n to the variable y (step S130).

Subsequently, the control unit 46 compares the variable y and the memory M(x) with each other so as to compare the order information corresponding to the terminal information D(x) stored in the memory M(x) and the variable y with each other (step S131). The control unit 46 moves down an order by substituting coordinates corresponding to lower-order information into the next coordinates until the memory M(x) is smaller than the variable y (step S132).

In a case where the condition of the memory M(x)<the variable y is satisfied in step S131, the saved PB is substituted into coordinates Py, the mobile terminal 2 placed on the charging pad 3 is inserted in a queue so that the charge order stored in the memory M(x) is set in the queue, and the coordinates (buffer) PB and the variable y are cleared (step S133). More specifically, for example, it is assumed that the memory M(x)=2 and n=3. In this case, an original charge order set for the detected mobile terminal 2 is 2nd. Accordingly, coordinates P2 for which the charge order of 2nd is currently set are substituted into coordinates having the charge order of 3rd (y=n=3rd), that is, the last charge order.

Since the equation of y=y−1=3−1=2 is obtained (step S132), the process returns to step S131 in which the condition is not satisfied. The coordinates (buffer) PB of the mobile terminal 2 placed at the coordinates P2 are substituted into the coordinates Py (step S133). After reordering has been completed, the power transmission coil 44 is moved to coordinates P1 for which the charge order of 1st is set (step S134).

Descriptions will be made with reference to FIG. 19.

After the processing of step S134, the control unit 46 is brought into the state 2 (Ping) (step S144), the state 3 (ID & CONF) (step S145), and the state 4 (power transfer) (step S146), and starts charging.

Subsequently, the control unit 46 monitors the completion of charging of the mobile terminal 2 (step S147). In a case where charging is not completed, the process returns to step S147 in which the control unit 46 continues monitoring. On the other hand, in a case where it is detected that charging has been completed, the charge order corresponding to the terminal information D(x) of the mobile terminal 2 for which charging has been completed is cleared from the memory M(x) and one is assigned to the variable y (step S148).

Subsequently, the control unit 46 monitors the satisfaction of the condition of n−M(x)≠0 (step S149). In a case where the condition of n−M(x)≠0 is satisfied, there is the mobile terminal 2 that has yet to be charged. Accordingly, the process proceeds to step S150. In a case where the condition is not satisfied, it is determined that the charging of all of the mobile terminals 2 has been completed and the process ends.

Subsequently, the control unit 46 determines whether the variable y is smaller than the number (n−M(x)) of the mobile terminals 2 that have yet to be charged (step S150). In a case where this condition is satisfied, the order set for the coordinates Py is moved up by substituting a value set for the next order into a value corresponding to lower-order information. At that time, one is added to y (step S151).

In a case where the condition of y≤n−M(x) is not satisfied, the variable y is cleared (step S152). More specifically, for example, it is assumed that n=3 and M(x)=2. When the charging of the mobile terminal 2 having the terminal information D(x) is completed, the comparison y=1 and n−M(x)=3−2=1 is performed. At that time, since the condition in step S150 is satisfied, the order set for the coordinates Py is moved up by substituting coordinates P2 into coordinates P1. Before moving up, the mobile terminal 2 corresponding to M(x)=2 is associated with the coordinates P1. After step S152, the process returns to step S134 illustrated in FIG. 18B in which the processing is repeated.

Descriptions will be made with reference again to FIGS. 18A and 18B.

In a case where order information corresponding to the terminal information D(x) of the mobile terminal 2 placed on the charging pad 3 is not stored in the memory M(x) in step S129, the control unit 46 associates the order of the mobile terminal 2 having the terminal information D(x) with the last order by substituting the variable n into the memory M(x) (step S141). At that time, in a case where another mobile terminal 2 is detected, the process proceeds to step S123. In a case where the mobile terminal 2 is not detected, the process proceeds to step S134 (step S142).

In a case where the mobile terminal 2 is not detected in step S123, the control unit 46 monitors the removal of the mobile terminal 2 from the charging pad 3 (step S135). In a case where the removal is detected, M(x) is assigned to the variable y (step S136).

Subsequently, the control unit 46 compares the variable y and the terminal number counter n−1 (step S137). In a case where the condition of y n−1 is satisfied, an order is moved up by substituting coordinates for which the next order is set into the coordinates Py corresponding to lower-order information (step S138). In a case where the condition is not satisfied in step S137, y=0 is set (step S139), the moving up processing is not performed, and the process proceeds to step S134.

In a case where the condition is not satisfied in step S135, the number of terminals (n) remaining on the charging pad 3 is monitored (step S140). In a case where the condition of n≤1 is satisfied, the process proceeds to S134. In a case where the condition is not satisfied, the process ends since no mobile terminal 2 is placed on the charging pad 3.

The charging pad 3 according to the fourth exemplary embodiment can perform charging while keeping a charge order set in advance even in a case where the mobile terminal 2 falls from the charging pad 3 for some reason and a user replaces the mobile terminal 2.

5. Modification

In the exemplary embodiments, the mobile terminal 2 is used. A mobile terminal that is powered from a secondary battery and employs a noncontact charging method may also be used. For example, a mobile sound recorder or reproducer or an information processing terminal such as a small notebook computer may be used.

In the above-described exemplary embodiments, the mobile terminal 2 that can be operated by a user with the touch panel 10 is used. The mobile terminal 2 may include operation buttons on the casing thereof, and a charge order change operation may be performed with the operation buttons. In addition, the mobile terminal 2 may be provided with an acceleration sensor, and a charge order may be changed under an impact on the casing (for example tapping with a finger). For example, control processing may be performed so that the highest priority is set at the time of one tap on the casing and the second highest priority is set at the time of two taps on the casing.

A battery pack into which the charge control unit 13, the secondary battery 14, and the power receiving unit 16 are integrated may be used, and the charging pad 3 may charge the secondary battery 14 when the battery pack is placed on the charging pad 3. Since the touch panel 10 and the display unit 11 are not usually disposed in the battery pack, a detection unit such as an acceleration sensor is disposed in the battery pack. The charge control unit 13 in the battery pack may notify the charging pad 3 of the number of taps on the battery pack.

The mobile terminal 2 may include a communication unit used for communication with the charging pad 3, and the control unit 12 may transmit a charge order change instruction to the charging pad 3 via the communication unit.

The series of processes according to the above-described exemplary embodiments can be executed not only by a piece of hardware but also by software. In a case where the series of processes is executed by software, a computer that is incorporated into a piece of dedicated hardware and has a program forming the software or a computer on which programs for various functions are installed can execute the series of processes. For example, a program forming desired software can be installed on a general-purpose personal computer and can be executed.

Alternatively, a recording medium that records the program code of software for realizing the functions of the above-described exemplary embodiments may be provided for a system or an apparatus. The functions are realized in such a manner that a computer (or a control unit such as a CPU) for the system or apparatus reads the program code stored in the recording medium and executes the program code.

Examples of the recording medium used to provide the program code include a flexible disk, a hard disk, an optical disc, a magneto-optical disk, a CD-ROM, a CD-R, a magnetic tape, a nonvolatile memory card, and a ROM.

The functions of the above-described exemplary embodiments are realized in such a manner that a computer reads the program code and executes the read program code. At that time, for example, the functions of the above-described exemplary embodiments may be realized in such a manner that an OS running on the computer performs part of or all of actual processing in accordance with an instruction made by the program code.

The present disclosure is not limited to the above-described exemplary embodiments. Various application examples and various modifications can be considered without departing from the scope of the present disclosure as claimed. That is, it is obvious to those skilled in the art that various changes, various combinations, other embodiments can be made in consideration of design or another factor insofar as they are within the scope of the present disclosure as claimed or the equivalents thereof.

The present disclosure can also be configured as follows:

(1) A charging apparatus comprising: a mounting portion on which a plurality of information processing apparatuses are mounted; a power transmission unit that transmits power in a non-contact manner to each of the plurality of information processing apparatuses placed on the mounting portion; and a control unit that receives a charge order instruction from at least one of the plurality of information processing apparatuses, and controls the power transmission unit to transmit power to each of the plurality of information processing apparatuses in an order determined based on the received charge order instruction.

(2) The charging apparatus of (1), wherein the power transmission unit includes a power transmission coil configured to move on a plane parallel to the mounting portion.

(3) The charging apparatus of (2), further comprising:
a position detection unit that detects a position of each of the plurality of information processing apparatuses on the mounting portion.

(4) The charging apparatus of (3), further comprising:
a positioning unit that moves the power transmission coil to positions corresponding to each of the plurality of information processing apparatuses detected by the position detection unit.

(5) The charging apparatus of any one of (1) to (4), wherein the processor receives a charge order instruction from each of the plurality of information processing apparatuses.

(6) The charging apparatus of (5), wherein the charge order instructions are generated at each of the plurality of information processing apparatuses based on a selection of an icon displayed at a display of each of the plurality of information processing apparatuses.

(7) The charging apparatus of any one of (5) and (6), wherein the charge order instructions are generated at each of the plurality of information processing apparatuses based on a number input on a display of each of the plurality of information processing apparatuses.

(8) The charging apparatus of any one of (5) to (7), wherein the charge order instructions are generated at each of the plurality of information processing apparatuses based on a number of inputs received on a display of each of the plurality of information processing apparatuses.

(9) A method performed by a charging apparatus, the method comprising: receiving a charge order instruction from at least one of a plurality of information processing apparatuses mounted on a mounting portion of the charging apparatus; and controlling a power transmission unit to transmit power to each of the plurality of information processing apparatuses in an order determined based on the received charge order instruction.

(10) A non-transitory computer-readable medium including computer program instructions, which when executed by a charging apparatus, cause the charging apparatus to perform a method comprising: receiving a charge order instruction from at least one of a plurality of information processing apparatuses mounted on a mounting portion of the charging apparatus; and controlling a power transmission unit to transmit power to each of the plurality of information processing apparatuses in an order determined based on the received charge order instruction.

(11) An information processing apparatus comprising: a power receiving unit configured to receive non-contact power from a charging apparatus; a charge control unit that controls charging a battery included in the information processing apparatus with the power received from the charging apparatus; a control unit that generates a charge order instruction indicating an order in which the information processing apparatus is to receive the non-contact power from the charging apparatus, and that controls transmission of the charge order instruction to the charging apparatus.

(12) The information processing apparatus of (11), wherein the power receiving unit includes a power receiving coil that receives the non-contact power from the charging apparatus.

(13) The information processing apparatus of (12), wherein the power receiving unit includes a rectification unit that converts AC power supplied from the power receiving coil to DC power.

(14) The information processing apparatus of (13), wherein the charge control unit controls charging the battery with the DC power supplied from the rectification unit.

(15) The information processing apparatus of (14), wherein the power receiving unit includes a switch unit that disconnects or connects the power receiving coil from or to the rectification unit and the charge control unit.

(16) The information processing apparatus of (15), wherein the control unit controls the power receiving unit to transmit the charge order instruction to the charging apparatus by causing the switch unit to become connected or disconnected.

(17) The information processing apparatus of any one of (11) to (16), further comprising: a display; and a touch panel superimposed on the display that receives an input corresponding to the charge order instruction, wherein the display displays an icon, and an input at the touch panel selecting the icon is the input corresponding to the charge order instruction, and the control unit generates the charge order instruction based on the selection of the icon.

(18) The information processing apparatus of any one of (11) to (17), further comprising: a display; and a touch panel superimposed on the display that receives an input corresponding to the charge order instruction, wherein the input is a number input to the touch panel, and the control unit generates the charge order instruction based on the number input to the touch panel.

(19) The information processing apparatus of any one of (11) to (18), further comprising: a display; and a touch panel superimposed on the display that receives an input corresponding to the charge order instruction, wherein the input is a number of times an input is received at the touch panel, and the control unit generates the charge order instruction based on the number inputs received at the touch panel.

The invention claimed is:

1. A charging apparatus comprising:
a mounting portion on which a plurality of information processing apparatuses are mounted; and
circuitry configured to
detect a position of each of the plurality of information processing apparatuses on the mounting portion;
transmit power in a non-contact manner to each of the plurality of information processing apparatuses placed on the mounting portion;
receive a charge order instruction from at least one of the plurality of information processing apparatuses; and
control transmitting power to each of the plurality of information processing apparatuses in an order determined based on the received charge order instruction.

2. The charging apparatus of claim 1, wherein
the circuitry includes a power transmission coil configured to move on a plane parallel to the mounting portion.

3. The charging apparatus of claim 2, wherein
the circuitry is configured to move the power transmission coil to positions corresponding to each of the plurality of information processing apparatuses based on the detected positions of each of the plurality of information processing apparatuses.

4. The charging apparatus of claim 1, wherein
the circuitry is configured to receive a charge order instruction from each of the plurality of information processing apparatuses.

5. A charging apparatus comprising:
a mounting portion on which a plurality of information processing apparatuses are mounted; and circuitry configured to
transmit power in a non-contact manner to each of the plurality of information processing apparatuses placed on the mounting portion; and
receive a charge order instruction from at least one of the plurality of information processing apparatuses; and
control the power transmission unit to transmit power to each of the plurality of information processing apparatuses in an order determined based on the received charge order instruction, wherein
the charge order instructions are generated by the at least one of the plurality of information processing apparatuses based on at least one of:
a selection of an icon displayed at a display of the at least one of the plurality of information processing apparatuses;
a number input on a display of the at least one of the plurality of information processing apparatuses; or a number of inputs received on a display of the at least one of the plurality of information processing apparatuses.

6. The charging apparatus of claim 5, wherein the charge order instructions are generated at each of the plurality of information processing apparatuses based on the number input on the display of each of the plurality of information processing apparatuses.

7. The charging apparatus of claim 5, wherein the charge order instructions are generated at each of the plurality of information processing apparatuses based on the number of inputs received on the display of each of the plurality of information processing apparatuses.

8. An information processing apparatus comprising:
 a power receiving coil configured to receive non-contact power from a charging apparatus;
 rectification circuitry configured to convert AC power supplied from the power receiving coil to DC power;
 charge control circuitry configured to control charging a battery included in the information processing apparatus with the power received from the charging apparatus;
 control circuitry configured to generate a charge order instruction indicating an order in which the information processing apparatus is to receive the non-contact power from the charging apparatus, and control transmission of the charge order instruction to the charging apparatus; and
 switching circuitry configured to disconnect or connect the power receiving coil from or to the rectification circuitry and the charge control circuitry.

9. The information processing apparatus of claim 8, wherein the charge control circuitry is configured to control charging the battery with the DC power supplied from the rectification circuitry.

10. The information processing apparatus of claim 8, wherein the control circuitry is configured to control the power receiving coil to transmit the charge order instruction to the charging apparatus by causing the switching circuitry to become connected or disconnected.

11. An information processing apparatus comprising:
 circuitry configured to
  receive non-contact power from a charging apparatus;
  control charging a battery included in the information processing apparatus with the power received from the charging apparatus;
  generate a charge order instruction indicating an order in which the information processing apparatus is to receive the non-contact power from the charging apparatus; and
  control transmission of the charge order instruction to the charging apparatus; and
 a display; and
 a touch panel superimposed on the display that receives an input corresponding to the charge order instruction, wherein
 the display displays an icon, and an input at the touch panel selecting the icon is the input corresponding to the charge order instruction, and the circuitry generates the charge order instruction based on the selection of the icon.

12. An information processing apparatus comprising:
 circuitry configured to
  receive non-contact power from a charging apparatus;
  control charging a battery included in the information processing apparatus with the power received from the charging apparatus;
  generate a charge order instruction indicating an order in which the information processing apparatus is to receive the non-contact power from the charging apparatus; and
  control transmission of the charge order instruction to the charging apparatus; and
 a display; and
 a touch panel superimposed on the display that receives an input corresponding to the charge order instruction, wherein
 the input is a number input to the touch panel, and the circuitry generates the charge order instruction based on the number input to the touch panel.

13. An information processing apparatus comprising:
 circuitry configured to
  receive non-contact power from a charging apparatus;
  control charging a battery included in the information processing apparatus with the power received from the charging apparatus;
  generate a charge order instruction indicating an order in which the information processing apparatus is to receive the non-contact power from the charging apparatus; and
  control transmission of the charge order instruction to the charging apparatus; and
 a display; and
 a touch panel superimposed on the display that receives an input corresponding to the charge order instruction, wherein
 the input is a number of times an input is received at the touch panel, and the circuitry generates the charge order instruction based on the number inputs received at the touch panel.

* * * * *